United States Patent
Ibaraki et al.

[11] Patent Number: 5,856,709
[45] Date of Patent: Jan. 5, 1999

[54] HYBRID VEHICLE DRIVE SYSTEM HAVING CLUTCH BETWEEN ENGINE AND SYNTHESIZING/DISTRIBUTING MECHANISM WHICH IS OPERATIVELY CONNECTED TO MOTOR/GENERATOR

[75] Inventors: Ryuji Ibaraki; Seitoku Kubo, both of Toyota; Yutaka Taga, Aichi-gun; Hiroshi Hata; Tsuyoshi Mikami, both of Toyota; Hideaki Matsui, Nishikamo-gun, all of Japan

[73] Assignee: Toyota Jidosha Kabushiki Kaisha, Toyota, Japan

[21] Appl. No.: 746,483

[22] Filed: Nov. 12, 1996

[30] Foreign Application Priority Data

Nov. 13, 1995 [JP] Japan ..................... 7-294148
Sep. 20, 1996 [JP] Japan ..................... 8-249356

[51] Int. Cl.$^6$ ................................. B60L 11/02
[52] U.S. Cl. ................... 290/45; 290/32; 475/5; 180/165
[58] Field of Search ................ 290/32, 45; 475/5; 180/165; 322/11

[56] References Cited

U.S. PATENT DOCUMENTS

| | | | |
|---|---|---|---|
| 3,623,568 | 11/1971 | Mori ........................... | 180/65 A |
| 4,393,964 | 7/1983 | Kemper ........................ | 192/0.044 |
| 5,258,651 | 11/1993 | Sherman ....................... | 290/23 |
| 5,359,308 | 10/1994 | Sun et al. ..................... | 355/216 |
| 5,433,282 | 7/1995 | Moroto et al. ................. | 180/65.2 |
| 5,495,912 | 3/1996 | Gray, Jr. et al. .............. | 180/165 |
| 5,558,588 | 9/1996 | Schmidt ........................ | 475/5 |
| 5,562,565 | 10/1996 | Moroto et al. ................. | 477/3 |
| 5,571,058 | 11/1996 | Schmidt ........................ | 475/6 |
| 5,603,671 | 2/1997 | Schmidt ........................ | 475/5 |
| 5,614,809 | 3/1997 | Kiuchi et al. .................. | 322/11 |
| 5,643,119 | 7/1997 | Yamaguchi et al. ............. | 475/5 |
| 5,698,905 | 12/1997 | Ruthlein et al. ................ | 290/32 |

FOREIGN PATENT DOCUMENTS

| | | |
|---|---|---|
| 0 528 412 A | 2/1993 | European Pat. Off. . |
| 0 645 271 A2 | 3/1995 | European Pat. Off. . |
| 0 716 947 A2 | 6/1996 | European Pat. Off. . |
| 0 769 404 A1 | 4/1997 | European Pat. Off. . |

*Primary Examiner*—Nestor Ramirez
*Assistant Examiner*—Nicholas Ponomarenko
*Attorney, Agent, or Firm*—Oliff & Berridge, PLC

[57] ABSTRACT

A hybrid drive system for a motor vehicle, having an engine operated by combustion of a fuel, an electric energy storage device for storing an electric energy, a motor/generator connected to the electric energy storage device, and a synthesizing/distributing mechanism which includes a first rotary element, a second rotary element connected to the motor/generator, and a third rotary element, and an output member connected to the third rotary element, wherein a first clutch is provided for connecting the first rotary element and the engine, and a second clutch is provided for connecting two elements of the first, second and third rotary elements of the synthesizing/distributing mechanism, for rotation of the two elements as a unit.

32 Claims, 17 Drawing Sheets

FIG. 4 ← VEHICLE FRONT

FIG. 12

| SHIFT LEVER | TRANSMISSION | CLUTCHES ||| BRAKES ||||| ONE-WAY CLUTCHES ||| SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | | | | | -4.550 |
| DRIVE | 1st | ○ | ○ | | | | | | ○ | ○ | | | 3.357 |
| | 2nd | ● | ○ | | | | | | ● | ○ | | ○ | 2.180 |
| | 3rd | ○ | ○ | | | ● | | ○ | | ○ | | | 1.424 |
| | 4th | ○ | ○ | ○ | | | ○ | | | ○ | ○ | | 1.000 |
| | 5th | ○ | ○ | ○ | ○ | | ○ | | | ○ | | | 0.753 |

FIG. 17

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | C₁ | C₂ | B₁ | B₂ | B₃ | B₄ | F₁ | F₂ | |
| NEUTRAL | N | | | | | | | | | — |
| REVERSE | Rev | | ○ | | | | ○ | | | -4.550 |
| DRIVE | 1st | ○ | | | | | ● | | ○ | 3.357 |
| DRIVE | 2nd | ○ | | | | ○ | | | | 2.180 |
| DRIVE | 3rd | ○ | | ● | ○ | | | ○ | | 1.424 |
| DRIVE | 4th | ○ | ○ | | ○ | | | | | 1.000 |

HYBRID VEHICLE DRIVE SYSTEM HAVING CLUTCH BETWEEN ENGINE AND SYNTHESIZING/DISTRIBUTING MECHANISM WHICH IS OPERATIVELY CONNECTED TO MOTOR/GENERATOR

BACKGROUND OF THE INVENTION

1. Field of the Invention

The present invention relates in general to a hybrid drive system for driving a motor vehicle, which has an engine and a motor/generator as drive power sources, and more particularly to a hybrid drive system controlled to be operated in a suitable operation mode depending upon a specific running condition of the vehicle.

2. Discussion of the Related Art

As a drive system for driving a motor vehicle with reduced exhaust emissions, for example, there has been proposed a hybrid drive system for a motor vehicle, which includes (a) an engine operated by combustion of a fuel, (b) an electric energy storage device for storing an electric energy, (c) a motor/generator connected to the electric energy storage device, (d) a synthesizing/distributing mechanism which includes a first rotary element connected to the engine, a second rotary element connected to the motor/generator and a third rotary element connected to an output member and which is adapted to mechanically synthesize and distribute a force among the first, second and third rotary elements, and (e) a clutch which connects two elements of the first, second and third rotary elements, for rotation of the two elements as a unit. An example of such a hybrid drive system is disclosed in U.S. Pat. No. 5,258,651, wherein a planetary gear device is employed as a synthesizing/distributing mechanism.

In such a known hybrid drive system, the engine and the motor/generator are both integrally connected to rotary elements of the planetary gear device, so that the engine and the motor/generator are always rotated while the vehicle is running. When the vehicle is run with only the motor/generator being used as a drive power source, or with the electric energy storage device being charged by regenerative braking, the energy efficiency of the hybrid drive system is relatively low due to a drag resistance of the engine. Thus, the vehicle cannot necessarily be run in a suitable mode or fashion.

SUMMARY OF THE INVENTION

It is therefore an object of this invention to provide a hybrid drive system for a motor vehicle, which can be controlled to be operated in a suitable mode depending upon a specific running condition of the vehicle.

The above object may be achieved according to the principle of the present invention, which provides a hybrid drive system for a motor vehicle, characterized by comprising: (a) an engine operated by combustion of a fuel; (b) an electric energy storage device for storing an electric energy; (c) a motor/generator connected to the electric energy storage device; (d) a first clutch; (e) a synthesizing/distributing mechanism including a first rotary element connected to the engine through the first clutch, a second rotary element connected to the motor/generator, a third rotary element, and an output member connected to the third rotary element; and (f) a second clutch for connecting two elements of the first, second and third rotary elements of the synthesizing/distributing mechanism, for rotation of the two elements as a unit.

In the hybrid drive system of the present invention constructed as described above, the engine is connected to the first rotary element of the synthesizing/distributing mechanism through the first clutch. By suitably engaging and releasing the first and second clutches, the motor/generator performs various functions as described below with respect to a first preferred form of the invention, and the hybrid drive system is selectively operable in various operation modes under the control of respective operation mode control means, as described below with respect to second through tenth preferred forms of the invention, depending upon various running conditions or states of the vehicle, as described below with respect to advantageous arrangements of the second through eighth preferred forms of the invention.

The motor/generator may be adapted to function as an electric motor and an electric generator or dynamo, but need not be used as both of the electric motor and the electric generator. The synthesizing/distributing mechanism may be a planetary gear device, a bevel gear type differential gear device, or any other gear device which has three mutually operatively connected rotary elements and which is adapted to synthesize and distribute a force. For instance, the synthesizing/distributing mechanism is arranged to synthesize an output of the engine and an output of the motor/generator and transmit a sum of these outputs to the output member, and to distribute the output of the engine to the motor/generator and the output member for driving the motor vehicle while charging the electric energy storage device. However, the synthesizing/distributing mechanism need not be adapted to function as both of a synthesizing mechanism and a distributing mechanism.

The first and second clutches preferably take the form of frictionally coupling clutches operated by hydraulic actuators. However, the first and second clutches may be other types of clutches such as positive or claw clutches, which are adapted to selectively connect and disconnect the appropriate members. A clutch may also be disposed between the secondary rotary member and the motor/generator, and/or between the third rotary element and the output member.

In a first preferred form of the present invention, the motor/generator functions as a drive power source for driving the motor vehicle, an electric generator operated by the engine to charge the electric energy storage device, an electric generator operated with a kinetic energy of the motor vehicle to charge the electric energy storage device and apply regenerative brake to the motor vehicle, and an auxiliary drive power source assisting the engine during running of the vehicle with the engine. Thus, the single motor/generator performs the different functions, whereby the hybrid drive system is made simpler in construction and less expensive than a hybrid drive system which uses an electric motor for driving the vehicle and a separate electric generator for charging the electric energy storage device and applying regenerative brake to the vehicle.

In a second preferred form of the invention, the hybrid drive system further comprises first operation mode control means for releasing the first clutch, engaging the second clutch, and operating the motor/generator as a drive power source to drive the motor vehicle. Namely, the first operation mode control means is adapted to establish a first operation mode in which the motor vehicle is driven with only the motor generator as the drive power source. In this first operation mode in which the first clutch is released, the hybrid drive system does not suffer from a power loss due to a drag resistance of the engine.

In one advantageous arrangement of the above second preferred form of the invention, the first operation mode control means is operated when a currently required output of the hybrid drive system is not larger than a predetermined threshold, while an amount of electric energy stored in the electric energy storage device is not smaller than a predetermined threshold. Generally, the motor/generator has a higher energy efficiency than the engine when the required output of the hybrid drive system is comparatively small. In the above condition, therefore, the first operation mode in which the vehicle is driven by the motor/generator assures smaller amounts of fuel consumption and exhaust gas emission than an operation mode in which the vehicle is driven by the engine. The present arrangement is effective to prevent deterioration of the charging and discharging efficiencies of the electric energy storage device due to excessive reduction of the electric energy amount stored in the storage device. It is noted that the energy efficiency when the motor/generator is operated as the drive power source is interpreted to mean an overall energy efficiency including that when the motor/generator is driven by the engine to charge the electric energy storage device.

In a third preferred form of this invention, the hybrid drive system further comprises second operation mode control means for engaging both of the first and second clutches, placing the motor/generator in a non-load state, and operating the engine as a drive power source to drive the motor vehicle. Namely, the second operation mode control means is adapted to establish a second operation mode in which the motor vehicle is driven with only the engine as the drive power source.

In one advantageous arrangement of the above second preferred form of the invention, the second operation mode control means is operated when a currently required output of the hybrid drive system is within a predetermined range while an amount of electric energy stored in the electric energy storage device is not smaller than a predetermined threshold, or operated when the currently required output is larger than an upper limit of the predetermined range while the amount of electric energy stored in the electric energy storage device is smaller than the predetermined threshold. Generally, the engine has a higher energy efficiency than the motor/generator when the required output of the hybrid drive system is medium, i.e., within the above-indicated range. In the above condition, therefore, the second operation mode in which the vehicle is driven by the engine assures smaller amounts of fuel consumption and exhaust gas emission than the operation mode in which the vehicle is driven by the motor/generator. When the required output of the hybrid drive system is comparatively large, it is desirable to drive the vehicle with both of the engine and the motor/generator as described below with respect to a fifth preferred form of the invention. When the electric energy amount stored in the electric energy storage device is smaller than the threshold value, however, the above second operation mode to drive the vehicle with only the engine is effective to prevent deterioration of the charging and discharging efficiencies of the electric energy storage device due to excessive reduction of the stored electric energy amount.

In a fourth preferred form of this invention, the hybrid drive system further comprises third operation mode control means for engaging both of the first and second clutches, and operating the engine as a drive power source to drive the motor vehicle while the motor/generator is driven by the engine to charge the electric energy storage device. Namely, the third operation mode control means is adapted to establish a third operation mode in which the vehicle is driven with only the engine as the drive power source while the motor/generator is driven by the engine to charge the electric energy storage device.

In one advantageous arrangement of the above fourth preferred form of the invention, the third operation mode control means is operated when a currently required output of the hybrid drive system is not larger than a predetermined threshold while an amount of electric energy stored in the electric energy storage device is smaller than a predetermined threshold. The present third operation mode in which the electric energy storage device is charged by the motor/generator during running of the vehicle by the engine is effective when the currently required output of the hybrid drive system is comparatively small or medium. When the currently required output is comparatively large, on the other hand, it is desirable to establish the above-indicated second operation mode in which the vehicle is driven with the engine without charting the storage device.

In a fifth preferred form of the present invention, the hybrid drive system further comprises fourth operation mode control means for engaging both of the first and second clutches, and operating both of the engine and the motor/generator as drive power sources to drive the motor vehicle. Namely, the fourth operation mode control means is adapted to establish a fourth operation mode in which the motor vehicle is driven with both of the engine and the motor/generator, with higher power than in the operation mode in which only the engine or motor/generator is used as the drive power source.

In one advantageous arrangement of the above fifth preferred form of the invention, the fourth operation mode control means is operated when a currently required output of the hybrid drive system is larger than a predetermined threshold while an amount of electric energy stored in the electric energy storage device is not smaller than a predetermined threshold. Since the engine and the motor/generator are both used as the drive power sources, the energy efficiency will not be deteriorated even in the above condition, in such an extent as in the operation mode in which only the engine or motor/generator is used as the drive power source. Accordingly, the fourth operation mode established in the above condition assures comparatively reduced fuel consumption and exhaust gas emission, and is effective to prevent deterioration of the charging and discharging efficiencies of the electric energy storage device due to excessive reduction of the stored electric energy.

In a sixth preferred form of the present invention, the hybrid drive system further comprises fifth operation mode control means for engaging the first clutch, releasing the second clutch, and increasing a reaction force of the motor/gernerator from zero to start the motor vehicle. Namely, the fifth operation mode control means is adapted to establish a fifth operation mode in which the vehicle is driven with the output of the engine transmitted to the output member, with the reaction force of the motor/generator being gradually increased from zero by controlling the regenerative braking torque or the torque in the forward direction while the motor/generator is rotated by the engine in the reverse direction in a non-load state. Thus, the fifth operation mode control means functions as means for starting the motor vehicle with the engine.

In one advantageous arrangement of the above sixth preferred form of the invention, the fifth operation mode control means is operated to start the motor vehicle with the engine as a drive power source. In a second advantageous arrangement of this form of the invention, the fifth operation mode control means controls a regenerative braking torque of the motor/generator to increase the reaction force, and is operated when an amount of electric energy stored in the electric energy storage device is not larger than a predetermined threshold. This fifth operation mode is effective to prevent excessive reduction of the electric energy amount stored in the electric energy storage device, since the fifth operation mode does not necessarily require an electric energy and since it is established to control the regenerative torque of the motor/generator to increase the reaction force when the electric energy amount stored in the storage device is not larger than the predetermined threshold. Accordingly, the fifth operation mode is effective to prevent deterioration of the charging and discharging efficiencies of the storage device due to an excessive amount of use of the electric energy.

In the above-indicated second advantageous arrangement of the sixth preferred form of the invention, the fifth operation mode is established when the stored electric energy amount is not larger than the predetermined threshold. If the stored electric energy amount is larger than the threshold, it is desirable to establish the first operation mode described above to start the vehicle with the motor/generator. However, the first operation mode may be replaced by an eleventh operation mode in which the vehicle is started with both of the engine and the motor/generator such that the second clutch is held engaged and the first clutch is placed in a slipping state, while the engine speed is raised above a predetermined value and the motor/generator is rotated in the vehicle running direction. In the eleventh operation mode, the vehicle can be started with a comparatively large torque. It is desirable to start the vehicle in the eleventh operation mode when the currently required output of the hybrid drive system is larger than a given threshold, and in the first operation mode when the currently required output is not larger the threshold.

In a third advantageous arrangement of the sixth preferred form of the invention, the fifth operation mode control means increases an output of the engine with an increase in the reaction force of the motor/generator. This arrangement makes it possible to prevent stalling of the engine due to reduction in its speed upon increasing of the reaction force of the motor/generator.

In a fourth advantageous arrangement of the sixth preferred form of the invention, the synthesizing/ distributing mechanism comprises a planetary gear device which includes a ring gear as the first rotary element, a sun gear as the second rotary element, and a carrier as the third rotary element, and the motor/generator has a torque capacity which is about $\rho$ times a maximum torque of the engine, where $\rho$ is a ratio of the number of teeth of the sun gear to the number of teeth of the ring gear. This arrangement permits the motor/generator to be small-sized while providing a sufficient torque, leading to reduced size and cost of the hybrid drive system. Further, the present arrangement permits starting of the vehicle by the engine with a larger torque than by the motor/generator. Namely, in the fifth operation mode, the ratios of the torque of the engine, torque of the carrier of the planetary gear device connected to the output member, and torque of the motor/generator are $1:(1+\rho):\rho$, where $\rho$ represents the ratio of the number of teeth of the sun gear to the number of teeth of the ring gear of the planetary gear device as indicated above. The torque of the motor/ generator is about $\rho$ times the engine torque, and the output torque of the carrier is about $(1+\rho)$ times the engine torque. The gear ratio $\rho$ is generally about 0.5. IN this case, the torque capacity of the motor/generator can be made as small as about a half of the maximum torque of the engine.

In a seventh preferred form of this invention, the hybrid drive system further comprises sixth operation mode control means for releasing the first clutch, engaging the second clutch, and causing the motor/generator to be driven by a kinetic energy of the motor vehicle to charge the electric energy storage device while applying regenerative brake to the motor vehicle. Namely, the sixth operation mode control means is adapted to establish a sixth operation mode in which the motor/generator is driven by the kinetic energy of the vehicle, to charge the electric energy storage device while regenerative brake similar to engine brake is applied to the vehicle. Since the first clutch is released to disconnect the engine from the planetary gear device, the energy loss due to a drag resistance of the engine is prevented.

In one advantageous arrangement of the above seventh preferred form of the invention, the sixth operation mode control means is operated when the motor vehicle is required to be braked while an amount of electric energy stored in the electric energy storage device is smaller than a predetermined threshold. In this case, the required amount of operation of the brake pedal by the vehicle operator is reduced, leading to easy control of the vehicle. Further, the electric energy storage device is charged by the motor/generator when the stored electric energy amount is smaller than the threshold, the present arrangement is effective to prevent deterioration of the charging and discharging efficiencies of the electric energy storage device due to excessive charging of the storage device.

In an eighth preferred form of the present invention, the hybrid drive system further comprises seventh operation mode control means for engaging the first clutch, releasing the second clutch, operating the engine and placing the motor/generator in a non-load state so as to establish electrical neutrality thereof. Namely, the seventh operation mode control means is adapted to establish a seventh operation mode in which the motor/generator is placed in a non-load state with the engine kept operated, whereby the motor/ generator is held in an electrically neutral state, and no power is produced from the output member of the synthesizing/distributing mechanism.

In one advantageous arrangement of this eighth preferred form of the invention, the seventh operation mode control means is operated when the motor vehicle is stopped during running thereof with the engine. This arrangement does not require the engine to be turned off upon stopping of the vehicle, and permits the vehicle to be started with the engine as in the fifth operation mode.

In a ninth preferred form of this invention, the hybrid drive system further comprises eighth operation mode control means for engaging both of the first and second clutches, placing the motor/generator in a non-load state, and turning off the engine, so as to apply engine brake to the motor vehicle. Namely, the eighth operation mode control means is adapted to establish an eighth operation mode in which the motor/generator is placed in the non-load state, while the engine is held off, whereby engine brake is applied to the vehicle.

In one advantageous arrangement of the ninth preferred form of the invention, the eighth operation mode control means is operated when the motor vehicle is required to be braked while an amount of electric energy stored in the electric energy storage device is not smaller than a predetermined threshold. In this case, the required amount of operation of the brake pedal by the vehicle operator is reduced, leading to easy control of the vehicle. Further, since the electric energy storage device is not charged, the present eighth operation mode prevents deterioration of the charging and discharging efficiencies of the storage device due to excessive charging of the storage device.

In a tenth preferred form of this invention, the hybrid drive system further comprises ninth operation mode control means for engaging the first clutch, and operating the motor/generator to start the engine through the synthesizing/distributing mechanism. Namely, the ninth operation mode control means is adapted to establish a ninth operation mode in which the engine is driven by the motor/generator through the synthesizing/distributing mechanism, to start the engine. This form of the invention does not require an exclusive starter (e.g., starter motor) for starting the engine, leading to reduced number of the required components and accordingly reduced cost of manufacture of the hybrid drive system.

In an eleventh preferred form of this invention, the synthesizing/distributing mechanism comprises a planetary gear device which includes a ring gear as the first rotary element, a sun gear as the second rotary element, and a carrier as the third rotary element, and the hybrid drive system further comprises a brake for inhibiting rotation of the ring gear. In the form of the hybrid drive system, the brake is provided for inhibiting the rotation of the ring gear of the planetary gear device which functions as the first rotary element connected to the engine through the first clutch. The present hybrid drive system permits the first through ninth operations modes described above, and also a tenth operation mode established by by tenth operation mode control means provided according to one advantageous arrangement of this eleventh preferred form of the invention. Thus, the hybrid drive system is operable in an appropriate one of the various operation modes, depending upon the particular running condition of the motor vehicle.

In the above-indicated advantageous arrangement of the eleventh preferred form of the invention, the hybrid drive system further comprises tenth operation mode control means for releasing both of the first and second clutches, engaging the brake, and boosting a torque of the motor/generator by the planetary gear device so that the boosted torque is transmitted to the output member of the planetary gear device. This arrangement permits the vehicle to be started and driven by the motor/generator with a comparatively large torque. Where the gear ratio of the planetary gear device is represented by $\rho$, the torque of the output member is $(1+\rho)/\rho$ times the torque of the motor/generator. Where the gear ratio $\rho$ is about 0.5, the torque of the motor/generator is boosted about three times. Preferably, the tenth operation mode control means is operated to start the motor vehicle with the motor/generator as a drive power source, particularly when it is desired to start the vehicle on an uphill road with the motor/generator with a relatively large torque, or to start and drive the vehicle in the backward direction with only the motor/generator.

In a twelfth preferred form of this invention, the synthesizing/distributing mechanism comprises a planetary gear device which includes a ring gear as the first rotary element, a sun gear as the second rotary element, and a carrier as the third rotary element, and the hybrid drive system further comprises a one-way clutch for permitting rotation of the ring gear in the same direction as the engine and inhibiting rotation of the ring gear in a direction opposite to a direction of rotation of the engine. In this hybrid drive system, the one-way clutch is provided to inhibit the rotation of the ring gear (i.e., first rotary element connected to the engine through the first clutch) in the direction opposite to that of the engine. By releasing at least the second clutch, therefore, the vehicle can be started or driven by the motor/generator with a relatively large torque, as in the tenth operation mode described above. While it is desirable to release also the first clutch, the first clutch may be held engaged if the engine is off. Unlike the brake provided according to the eleventh preferred form of the invention, the one-way clutch provided in this twelfth preferred form does not require control of its engaging and releasing actions, and would not be influenced by a failure of the hydraulic or electric system, assuring increased operating reliability.

In a thirteenth preferred form of this invention, the engine, the synthesizing/distributing mechanism, and the motor/generator are arranged in the order of description, coaxially with a first axis, and the hybrid drive system further comprises a differential gear device for distributing power received from the output member to a right wheel and a left wheel of the motor vehicle. The differential gear device includes a pair of output shafts which are parallel to the first axis, an input member disposed at substantially the same position as the output member in an axial direction of the first axis, and a differential gear mechanism disposed at substantially the same position as the synthesizing/distributing mechanism in the axial direction. Usually, the output member of the synthesizing/distributing mechanism has a comparatively small diameter while the input member of the differential gear device has a comparatively large diameter, for boosting the torque of the output member of the synthesizing/distributing mechanism. These output and input members are located at substantially the same axial position. Further, the synthesizing/distributing mechanism and the differential gear mechanism which have medium diameters are located at substantially the same axial position. In this arrangement, the axis with which the engine and the motor/generator are aligned and the axis of the differential gear device can be made relatively close to each other, and the axial dimension of the hybrid drive system can be made relatively small, whereby the hybrid drive system can be made compact.

In the eleventh and twelfth preferred forms of the hybrid drive system in which a planetary gear device is used as the synthesizing/distributing mechanism, the ring gear, sun gear and carrier of the planetary gear device are provided as the first, second and third rotary elements. However, the sun gear and the ring gear are used as the first and second rotary elements, respectively. The second clutch is provided for connecting two elements of these three rotary elements, and is preferably disposed between the sun gear and the carrier, in view of the load torque upon connection of the two rotary elements. However, the second clutch may be disposed between the sun gear and the ring gear, or between the carrier and the ring gear.

In the first, sixth and tenth operation modes described above, it is generally desirable to hold the engine off for the purpose of reducing the fuel consumption and exhaust gas emission. Since the first clutch is released, however, the engine may be operated as needed. In the ninth operation mode in which the engine is driven by the motor/generator, the second clutch may be engaged while the power transmission path is disconnected with a transmission placed in the neutral position, for example. Alternatively, the second clutch is released while the rotation of the output member of the synthesizing/distributing mechanism is inhibited by a suitable means such as a parking brake. In the first operation mode in which the vehicle is driven with the motor/generator as the drive power source with the first and second clutches being released and engaged, respectively, the first clutch may be engaged to start the engine with the motor/ generator. In this case, the motor/generator is desirably operated so as to provide an output larger than the currently required output, so that the engine is driven with a surplus output of the motor/generator.

Operation modes other than the first through tenth operation modes described above may be provided. For instance, the hybrid drive system may be operated in a mode in which the first clutch is engaged and the second clutch is released, while the rotation of the output member is inhibited by suitable means such as a parking brake. In this mode, the motor/generator is driven by the engine to charge the electric energy storage device while the vehicle is stationary. Alternatively, the motor/generator may be driven by the engine by disconnecting the power transmission path with an automatic transmission placed in the neutral position, for example, while the first and second clutches are both engaged.

The hybrid drive system according to the present invention does not necessarily include a transmission, but may include a suitable transmission such as a gear type transmission having two or more speed ratios, or a transmission whose speed ratio is continuously variable. The gear type transmission may be of a parallel two-axes type or a planetary gear type. The continuously variable transmission may be a belt-and-pulley type or toroidal type. In the thirteenth preferred form of the invention described above, the engine, synthesizing/distributing mechanism, and motor/generator are disposed in this order, in coaxial relationship with each other. In this case, the second clutch may be disposed on one side of the motor/generator remote from the output member, and a connecting shaft is disposed extending through a bore of a hollow rotor shaft of the motor/generator, for connecting the second clutch and the second rotary member of the synthesizing/distributing mechanism. In this arrangement, a parallel two-axes type transmission may be disposed parallel to the axis of the assembly including the engine, synthesizing/distributing mechanism and motor/generator, such that a shift gear portion of the transmission which portion has a comparatively small diameter is disposed at substantially the same axial position as the motor generator, and such that hydraulically operated shifting clutches for shifting the transmission are disposed on the above-indicated side of the motor/generator. According to this arrangement, the motor/generator which has a comparatively large diameter is axially offset from the shifting clutches which also have comparatively large diameters, so that the axis of the above-indicated assembly and the axis of the transmission can be made close to each other. The differential gear device described above with respect to the thirteenth preferred form of the invention is disposed on one side of the output member remote from the motor/generator or shift gear portion of the transmission, so that the differential gear device and the transmission can be disposed close to each other in the radial direction. Accordingly, the axial and radial dimensions of the hybrid drive system are both reduced, leading to compact construction of the system. The differential gear device is preferably a bevel gear type, but may be a planetary gear type.

Where the parallel two-axes type transmission is used, the output member of the synthesizing/distributing mechanism and the input shaft of the transmission may be connected by a chain. In this case, the hybrid drive system may be installed on the motor vehicle such that the axis of the input shaft of the transmission and the axis of the assembly including the engine, synthesizing/distributing mechanism and motor/generator extend in the transverse direction of the vehicle, and such that the axis of the input shaft of the transmission is located above and rearwardly of the axis of the above-indicated assembly, as viewed in the running direction of the vehicle. Further, the axis of the output shaft of the transmission is located below and rearwardly of the axis of the input shaft, while the axis of the differential gear device is located below the axis of the output shaft of the transmission. In the present arrangement, a space is left above the axis of the above-indicated assembly, and a controller for the motor/generator, electric energy storage device and other devices can be accommodated in this space. Since the transmission is located rearwardly of the engine and the motor/generator, a sufficient space may be provided in front of the engine and the motor/generator, so that this sufficient space can be used to absorb a shock upon application of a force to the engine and motor/generator in the rearward direction of the vehicle.

The above-indicated assembly including the engine, synthesizing/distributing mechanism and motor/generator may further include a flywheel and a damper disposed between the engine and the first clutch. The flywheel and damper may be disposed on one side of a first partition wall remote from the first clutch and the output member (e.g., sprocket) of the synthesizing/distributing mechanism. In this case, an oil passage for a working fluid for operating the first clutch may be formed in the first partition wall. The motor/generator may be disposed on one side of a second partition remote from the output member, and located between this second partition wall and a third partition wall. Namely, the motor-generator is disposed in a space which is defined between the second and third partition walls and which is fluid-tightly sealed by oil seals. A resolver for detecting the angular position of the motor/generator may be disposed on the third partition wall. The rotor shaft of the motor/generator may be rotatably supported by the second and third partition walls via suitable bearings. The connecting shaft indicated above extends through the bore of the hollow rotor shaft, such that the connecting shaft is rotatable relative to the rotor shaft. The second clutch may be disposed between the third partition wall and a fourth partition wall. An oil passage for the working fluid for operating the second clutch may be formed in the fourth partition wall.

In the hybrid drive system according to the thirteenth preferred form of the invention, the outputs of the engine and the motor/generator are synthesized by the synthesizing/distributing mechanism, and the sum is delivered to the differential gear device. Alternatively, the output of the engine may be distributed to each drive wheel of the vehicle through the first clutch, transmission and differential gear device. In this case, the synthesizing/distributing mechanism, motor generator and second clutch may be provided for each drive wheel. The hybrid drive system according to the thirteenth preferred form of the invention is suitably used for a front-engine front-drive vehicle (F-F vehicle). In this case, the hybrid drive system is installed such that the axis of the assembly including the engine, synthesizing/distributing mechanism and motor/generator is parallel to the transverse direction or direction of width of the vehicle. Alternatively, the hybrid drive system may be used for a front-engine rear-drive vehicle (F-R vehicle). In this case, the hybrid drive system is installed such that the axis of the assembly including the engine and motor/generator is parallel to the longitudinal direction of the vehicle. The hybrid drive system according to the invention may be used for any equipment other than a motor vehicle.

BRIEF DESCRIPTION OF THE DRAWINGS

The above and optional objects, features, advantages and industrial and technical significance of this invention will be better understood by reading the following detailed description of presently preferred embodiments of the invention, when considered in connection with the accompanying drawings, in which:

FIG. 12 is a view indicating operating states of various coupling elements for establishing different operating positions of an automatic transmission in the hybrid drive system of FIG. 10;

FIG. 17 is a view indicating operating states of various coupling elements for establishing different operating positions of the automatic transmission in the embodiment of FIG. 16.

DETAILED DESCRIPTION OF THE PREFERRED EMBODIMENTS

Figure 1:
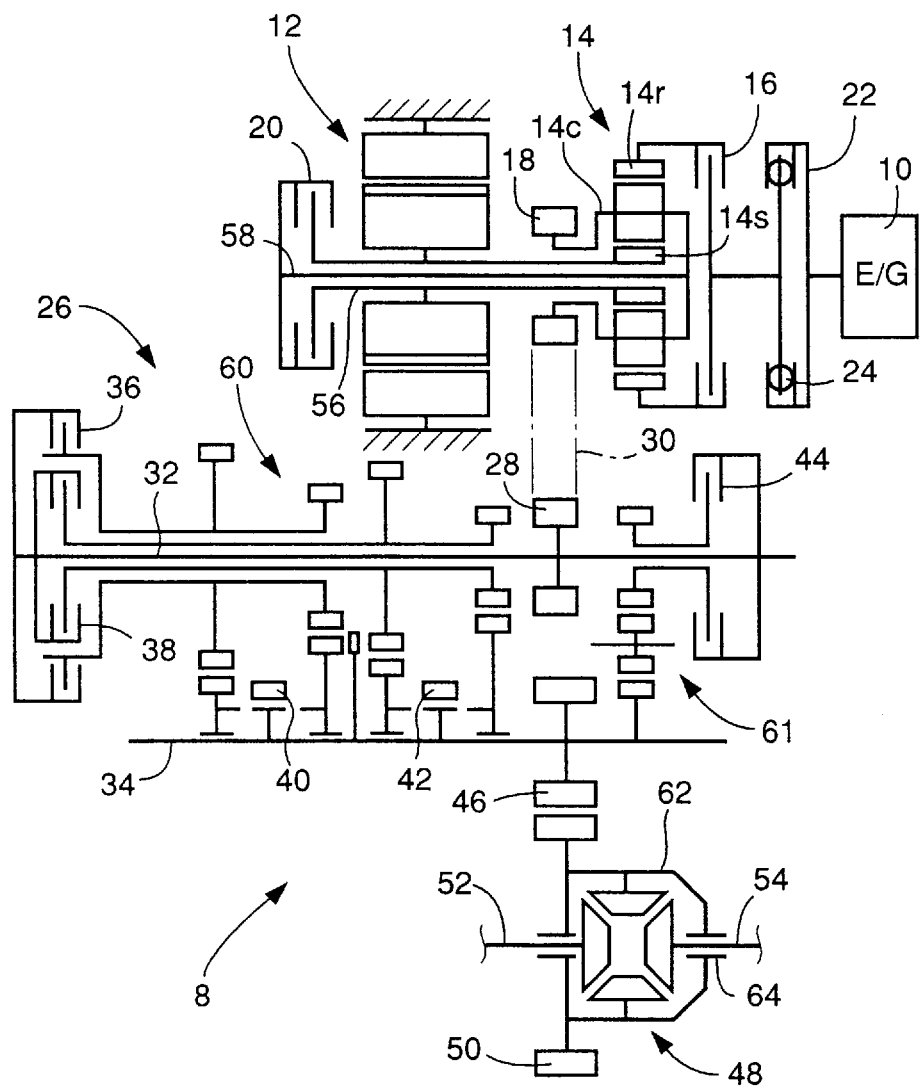
FIG. 1 is a schematic view illustrating a general arrangement of a hybrid drive system according to one embodiment of this invention.
Figure 2:
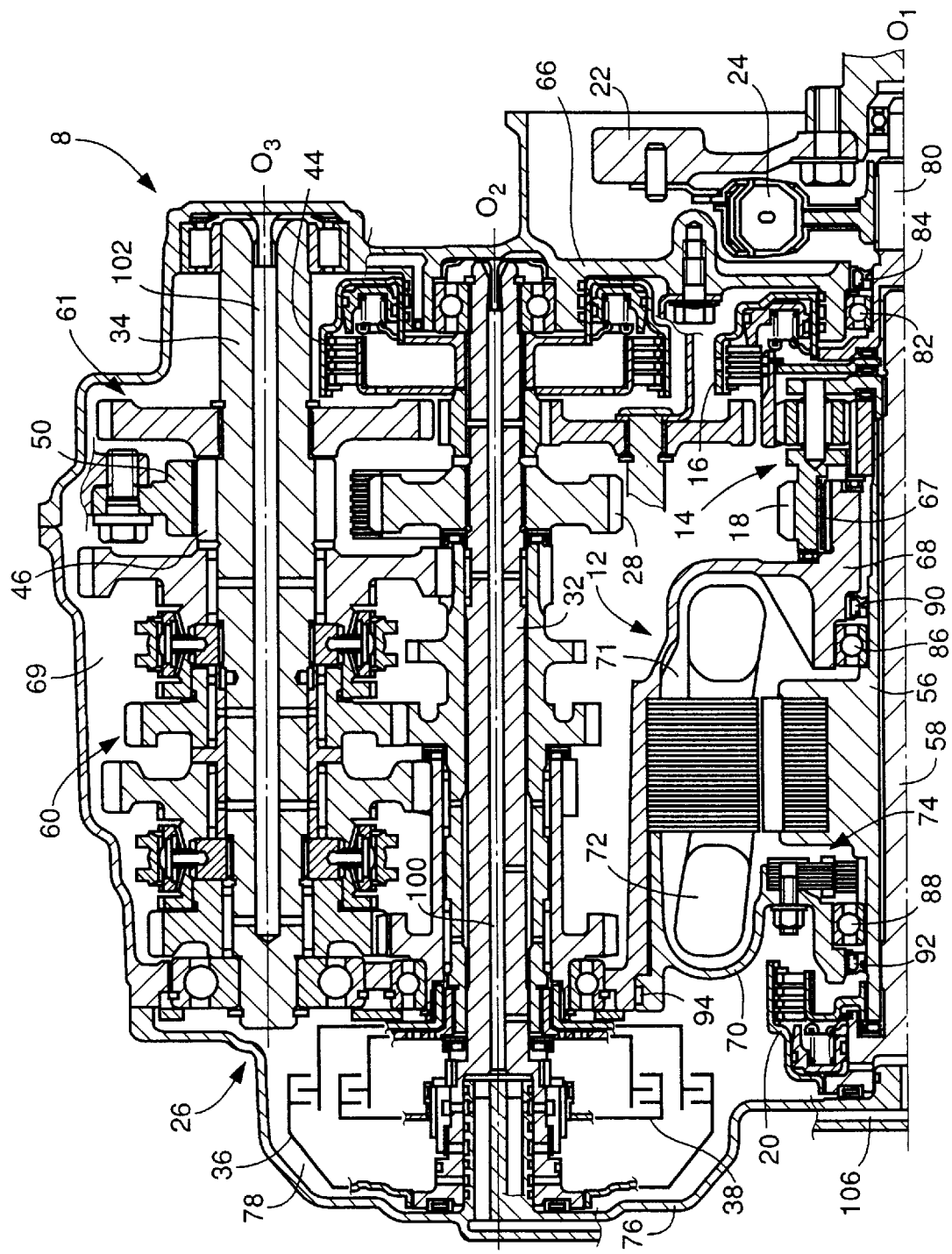
FIGS. 2 and 3 are developed views in cross sectional showing in detail the construction of the hybrid drive system of FIG. 1.
Figure 3:
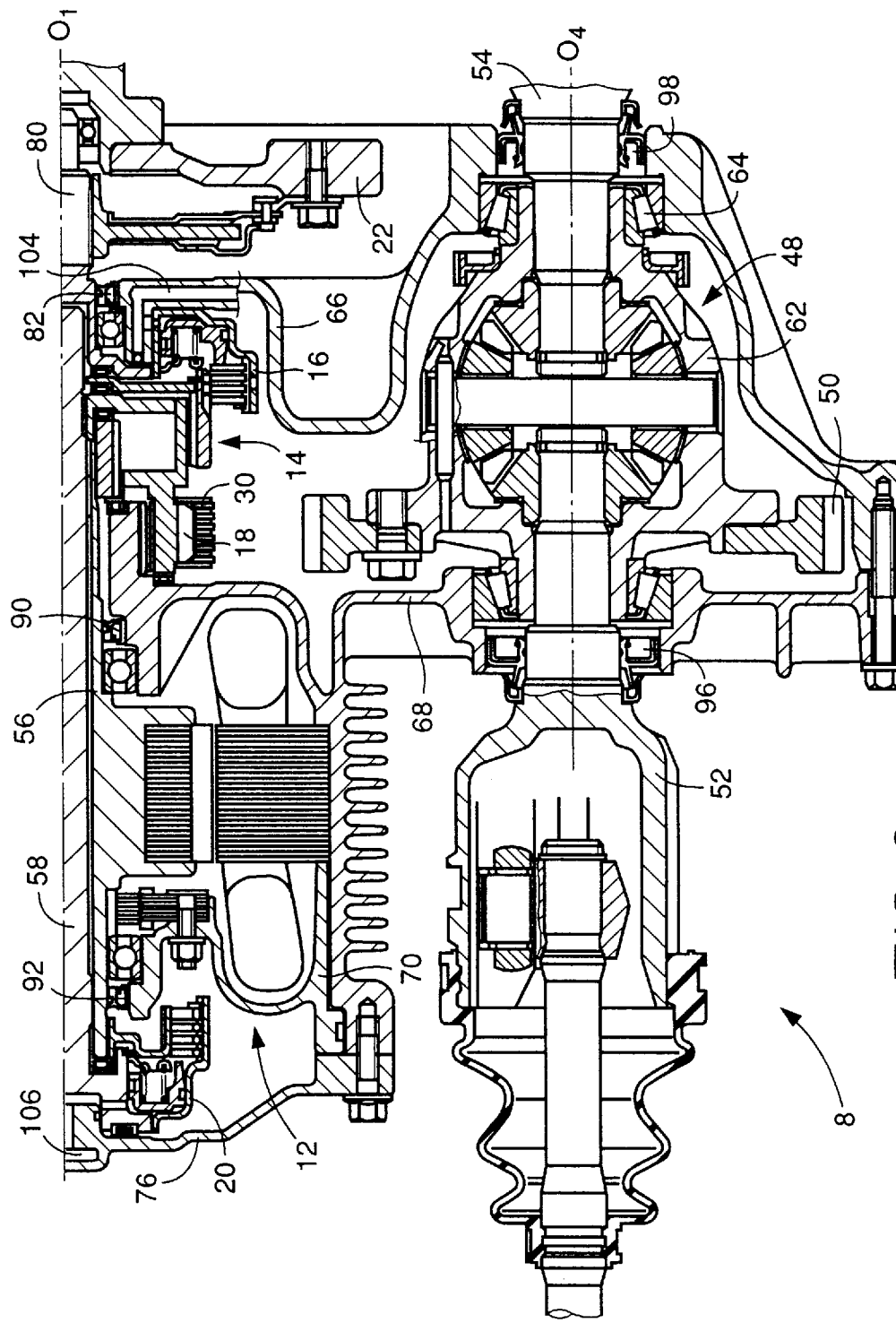

Referring first to the schematic view of FIG. 1 and the developed cross sectional views of FIGS. 2 and 3, there is shown a hybrid drive system 8 adapted for use on a front-engine front-drive vehicle (F-F vehicle). The hybrid drive system 8 is installed on the vehicle such that various axes of the hybrid drive system 8 are substantially parallel to the transverse or lateral direction (direction of width) of the vehicle. The hybrid drive system 8 includes an engine 10 such as an internal combustion engine operated by combustion of a fuel, a motor/generator 12, and a planetary gear device 14 of single pinion type. The planetary gear device 14 functions as a synthesizing/distributing mechanism for mechanically synthesizing and distributing a force. The planetary gear device 14 includes a first rotary element in the form of a ring gear 14r connected to the engine 10 through a first clutch 16, a second rotary element in the form of a sun gear 14s connected to a rotor shaft 56 of the motor/generator 12, and a third rotary element in the form of a carrier 14c which has an integrally formed sprocket 18 functioning as an output member. The sun gear 14s and the carrier 14c are connected to each other by a second clutch 20. An output of the engine 10 is transferred to the first clutch 16 through a flywheel 22 and a damper 24. The flywheel 22 serves to reduce speed and torque variations of the engine 10. The damper 24 includes a suitable elastic member such as a spring or a rubber member. The first and second clutches 16, 20 are friction type multiple-disk clutches, each of which is operated between engaged and released states thereof by a hydraulic actuator.

The sprocket 18 is connected through a chain 30 to a driven sprocket 28 which functions as an input member of an automatic transmission 26. The automatic transmission 26 is a parallel two-axes type transmission having a first or input shaft 32 on which the driven sprocket 28 is provided, and a second or output shaft 34 parallel to the first shaft 32. The automatic transmission 26 has four pairs of mutually meshing gears for forward driving of the vehicle, and a pair of gears connected through an idler gear for reverse running of the vehicle. The automatic transmission 26 includes two frictionally coupling clutches 36, 38 operated by respective hydraulic actuators, and two positive or claw clutches 40, 42 operated by respective hydraulic actuators. With these clutches 36, 38, 40, 42 selectively placed in their engaged and released positions, the automatic transmission 26 is selectively placed in one of a neutral position and four forward-drive positions. The automatic transmission 26 further includes a frictionally coupling clutch 44 operated by EL hydraulic actuator for establishing a reverse-drive position. The second or output shaft 34 has an output gear 46 mounted thereon, which meshes with a ring gear 50 of a bevel gear type differential gear device 48. The ring gear 50 functions as an input member of the differential gear device 48. Power transferred to the ring gear 50 is distributed to right and left drive wheels (front wheels) of the vehicle through a pair of output shafts 52, 54 of the differential gear device 48. In FIG. 1, a portion corresponding to the lower half of the second shaft 34 is not shown except for the output gear 46), since the assembly including the second shaft 34 is symmetrical with respect to the axis of the second shaft 34.

As is apparent from FIGS. 1–3, the engine 10, flywheel 22, planetary gear device 14, sprocket 18, motor/generator 12 and second clutch 20 are arranged in the order of description, coaxially with a first axis O1. The first clutch 16 is disposed such that the frictionally coupling portion is located radially outwardly of the planetary gear device 14. The hydraulic actuator for the first clutch 16 is disposed on the right side (as seen in FIG. 2) of the planetary gear device 14, namely, between the planetary gear device 14 and the flywheel 22. The second clutch 20 is disposed on the left side (as seen in FIG. 2) of the motor/generator 12, and is connected to the carrier 14c of the planetary gear device 14 through a connecting shaft 58 which extends through a bore of the hollow rotor shaft 56 of the motor/generator 12. The connecting shaft 58 is rotatable relative to the hollow rotor shaft 56. The rotor shaft 56 is splined to the sun gear 14s, for rotation with the sun gear 14s.

The automatic transmission 26 is disposed such that the first and second shafts 32, 34 are aligned or coaxial with respective second and third axes O2 and O3 which are parallel to the above-indicated first axis O1. The driven sprocket 28 and the output gear 46 of the automatic transmission 26 are at substantially the same axial position as the sprocket 18 of the planetary gear device 14. As shown in FIG. 2, a shift gear portion 60 which has a comparatively small diameter and which includes the four pairs of gears for forward driving of the vehicle is disposed at substantially the same axial position as the motor/generator 12 having a comparatively large diameter. The frictionally coupling clutches 36, 38 having a comparatively large diameter are disposed at substantially the same axial position as the second clutch 20 located on the left side of the motor/generator 12. Further, a reverse gear train 61 including the idler gear is disposed at substantially the same axial position as the planetary gear device 14, and the frictionally coupling clutch 44 is disposed at substantially the same axial position as the first clutch 16. While the frictionally coupling clutches 36, 38 are schematically shown also in FIG. 2, the frictionally coupling portion including friction disks of the clutch 38 is disposed radially inwardly of that of the clutch 36, with substantial alignment with each other in the axial direction. The hydraulic actuators for operating these frictionally coupling clutches 36, 38 are similar in construction to the hydraulic actuators for the first and second clutches 16, 20.

The differential gear device 48 is disposed such that the two output shafts 52, 54 are aligned with or coaxial with a fourth axis O4 parallel to the first axis O1 and such that the ring gear 50 having a comparatively large diameter is disposed at substantially the same axial position as the sprocket 18. The differential gear device 48 has a differential case 62 incorporating differential gears. The differential case 62 is located at substantially the same axial position as the planetary gear device 14 and the first clutch 16, that is, located on the right side (as seen in FIG. 3) of the sprocket 18 remote from the motor/generator 12 and the shift gear portion 60 of the automatic transmission 26. The differential case 62 is rotatably supported at its smallest diameter opposite end portions by bearings which include a bearing 64 located at substantially the same axial position as the flywheel 22 having a comparatively large diameter.

The hybrid drive system is accommodated within a housing structure which includes a first partition wall in the form of a covering member 66 and a second partition wall in the form of a housing member 68. The flywheel 22 and the damper 24 are disposed on one side of the covering member 66 nearer to the engine 10. The covering and housing members 66, 68 cooperate to define a first space 69 in which there are accommodated the first clutch 16, frictionally coupling clutch 44 for the reverse drive, and the various gear devices which include the planetary gear device 14, sprocket 18, shift gear portion 60 of the automatic transmission, gear train 61 for the reverse drive, and differential gear device 48. The sprocket 18 is rotatably supported by the housing member 68 via a needle bearing 67. To the housing member 68, there is fixed a third partition wall in the form of a motor covering 70. The housing member 68 and the motor covering 70 cooperate to define a second space 71 in which the motor/generator 12 is accommodated. The motor/generator 12 includes a stator which is integrally fixed to the housing member 68 and the motor covering 70. The stator includes a stator coil 72 which cooperates with the motor housing 70 to define a space in which a resolver 74 is disposed as means for detecting the speed of the rotor shaft 56. To the housing member 68, there is also fixed a fourth partition wall in the form of a covering member 76 which cooperates with the motor covering 70 and the housing member 68 to define a third space 78 in which there are accommodated the second clutch 20 and the frictionally coupling clutches 36, 38.

A transfer shaft 80 is provided for transferring power from the damper 24 to the first clutch 16. The transfer shaft 80 is rotatably supported by the covering member 66 via a ball bearing 82. An oil seal 84 is provided between the transfer shaft 80 and the covering member 66, to secure fluid tightness therebetween, that is, to prevent leakage of a lubricant out of the first space 69. The rotor shaft 56 of the motor/generator 12 is rotatably supported by the housing member 68 and the motor covering 70 via a pair of ball bearings 86, 88. An oil seal 90 is provided to secure fluid tightness between the rotor shaft 56 and the housing member 68, while an oil seal 92 is provided to secure fluid tightness between the rotor shaft 56 and the motor covering 70. These oil seals 90, 92 prevent flows of the lubricant from the first and third spaces 69, 71 into the second space 71. Between the housing member 68 and the motor covering 70, there is also provided a sealing member 94 such as an O-ring. The ball bearings 86, 8 and the oil seals 90, 92 are disposed in the above-indicated space defined by the motor housing 70 and the stator coil 72. An oil seal 96 is provided to secure fluid tightness between the output shaft 52 and the housing member 68, while an oil seal 98 is provided to secure fluid tightness between the output shaft 54 and the covering member 66.

Suitable amounts of lubricant are accommodated in the first and third spaces 69, 78, so that the various bearings and gears, and friction members of the various clutches are lubricated in an oil-bath lubrication manner. The first and second shafts 32, 34 of the automatic transmission 26 have respective lubrication passages 100, 102 formed along their centerlines. A lubricant delivered by an electrically powered pump is supplied to needle bearings which rotatably support the various shift gears. The rotor shaft 56 and the connecting shaft 58 define an annular space which may be used as a lubricant passage. The covering member 66 has an oil passage 104 for feeding a working oil to the hydraulic actuator for the first clutch 16. The covering member 76 has an oil passage 106 for feeding the working oil to the hydraulic actuator for the second clutch 20. The covering members 66, 76 further have oil passages for feeding the working oil to the hydraulic actuators for the frictionally coupling clutches 36, 38, 44.

Figure 4:
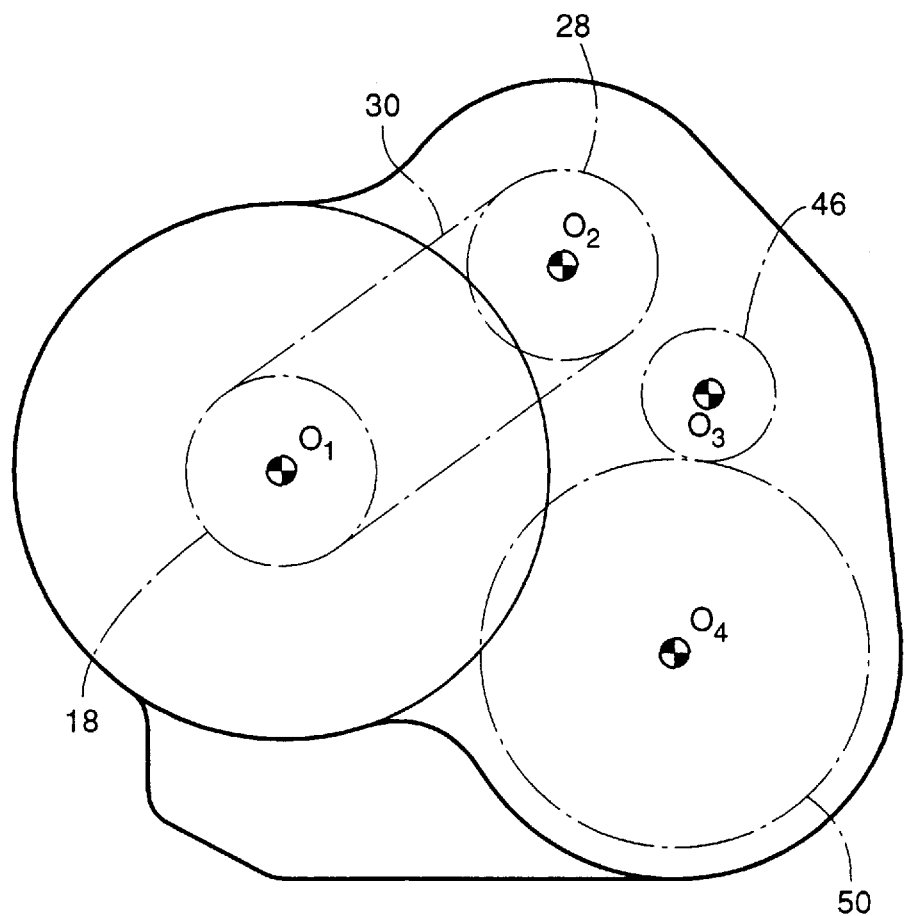
FIG. 4 is a view indicating a positional relationship of various axes in the hybrid drive system of FIG. 1 as viewed in the transverse direction of the vehicle.

Referring to FIG. 4, there is shown the positional relationship of the first through fourth axes O1, O2, O3 and O4, as viewed in the transverse direction of the vehicle. In FIG. 4, the left side of the view corresponds the front side of the motor vehicle. As is apparent from FIG. 4, the second axis O2 which is the axis of the first shaft 32 of the automatic transmission 26 is located above and rearwardly of the first axis O1, while the third axis O3 which is the axis of the second shaft 34 of the automatic transmission 26 is located below and rearwardly of the second axis O2. Further, the fourth axis O4 which is the axis of the differential gear device 48 is located below the third axis O3, and has the lowest position of all the four axes O1–O4.

Figure 5:
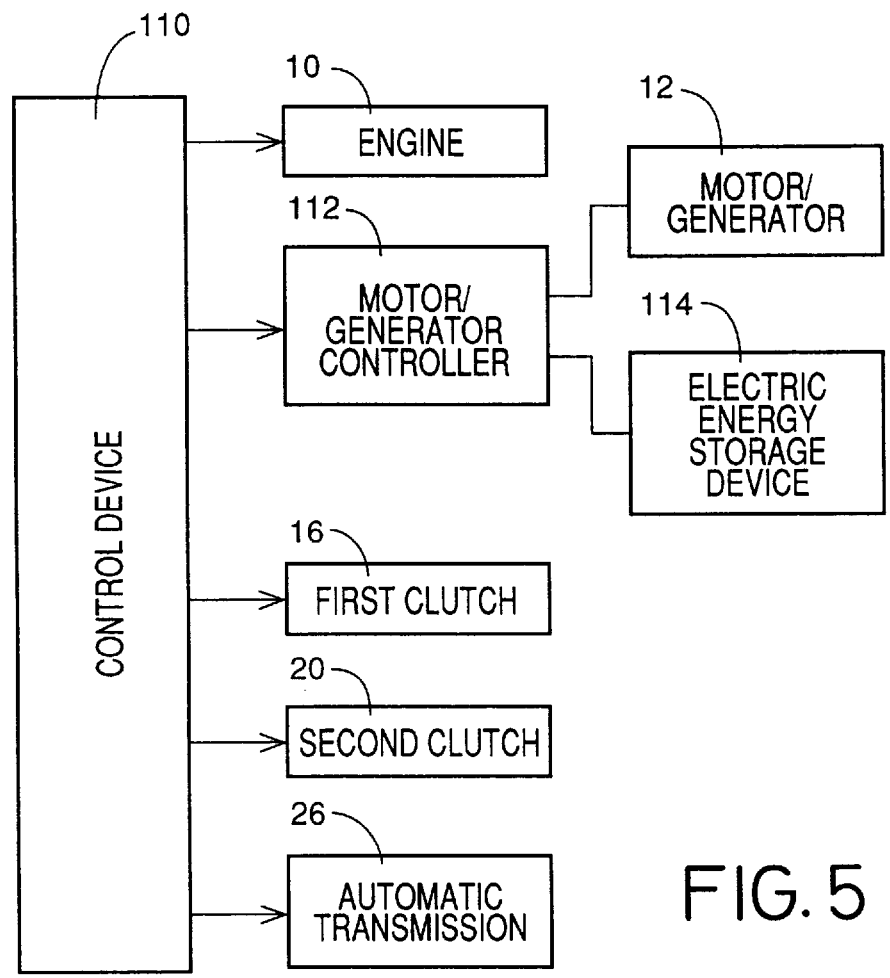
FIG. 5 is a block diagram illustrating a control system provided in the hybrid drive system of FIG. 1.

The hybrid drive system 8 is provided with a control system as shown in FIG. 5, which includes a control device 110. The engine 10 is controlled by the control device 110. Described more specifically, the control device 110 controls the opening angle of a throttle valve, the amount of fuel injection, the ignition timing and the other operating conditions of the engine 10. The motor/generator 12 is connected to an electric energy storage device 114 such as a battery through a motor/generator controller (inverter) 112. The control device 110 selectively places the motor/ generator 12 in one of a DRIVE state, a CHARGING state and a NON-LOAD or FREE state. In the DRIVE state, the motor/generator 12 is operated as an electric motor to provide a predetermined torque, with an electric energy being supplied thereto from the electric energy storage device 114. In the CHARGING state, the motor/generator 12 is operated as an electric generator or dynamo, by regenerative braking (i.e., electrical braking torque of the motor/generator per se), so as to charge the electric energy storage device 114 with the electric energy. In the NON-LOAD or FREE state, the motor/generator 12 is placed in a non-load current of the motor/generator 12. The stored electric energy amount SOC can be obtained from a change in the voltage, current-voltage (I-V) characteristic of the electric energy storage device 114, or from a difference between a sum of electric energy amounts stored in the CHARGING state and a sum of electric energy amounts discharged or consumed by the electric motor 12, or alternatively from an electric current of the motor 12 or charging efficiency of the generator 12 when the motor/generator 12 is operated as the generator.

TABLE 1

| MODE | CLUTCHES 16 | CLUTCHES 20 | ENGINE 10 | STORAGE DEVICE 114 | MODE NOMENCLATURE |
|---|---|---|---|---|---|
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGE |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING | condition permitting free rotation of the rotor shaft 56. The hydraulic actuators for the first and second clutches 16, 20 are controlled by the control device 110 through respective solenoid-operated valves, so that these clutches 16, 20 are selectively placed in their engaged and released states, for selective connection and disconnection between the engine 10 and the ring gear 14r, and between the sun gear 14s and the carrier 14c. Similarly, the hydraulic actuators for the frictionally coupling clutches 36, 38, 44 and the positive clutches 40, 42 are controlled by the control device 110 through respective solenoid-operated valves, so that these clutches 36, 38, 44, 40, 42 are selectively placed in their engaged and released positions, so as to establish one of the operating positions (four forward-drive position, reverse position and neutral position) of the automatic transmission 26.

The control device 110 includes a microcomputer incorporating a central processing unit (CPU), a read-only memory (ROM), and a random-access memory (RAM), and is adapted to control the hybrid drive system 8 according to a predetermined control program, more specifically, select one of fine operation modes (indicated in TABLE 1 below) according to an operation mode determining sub-routine illustrated in the flow chart of FIG. 6 by way of example, and operate the hybrid drive system 8 in the selected operation mode. The control device 110 receives various signals from various detectors, such as signals indicative of: torque $T_E$ and speed $N_E$ of the engine 10; speed $N_M$ of the motor 12; output speed No of the automatic transmission 16 (which speed can be used to obtain running speed of the vehicle); operation amount $\theta_{AC}$ of an accelerator pedal (as one example of a parameter indicative of a currently required output of the hybrid drive system 8); amount of electric energy SOC stored in the electric energy storage device 114; an operating state of a brake system (e.g., operating state of a brake pedal); and currently selected position $L_{SH}$ of a shift lever. The engine torque $T_E$ can be obtained from the opening angle of the throttle valve or fuel injection amount, while the motor torque $T_M$ can be obtained from the electric In TABLE 1, "NO ENG. CSMD" in the column of the storage device 114 means that no electric energy stored in the storage device 114 is consumed.

Figure 6:
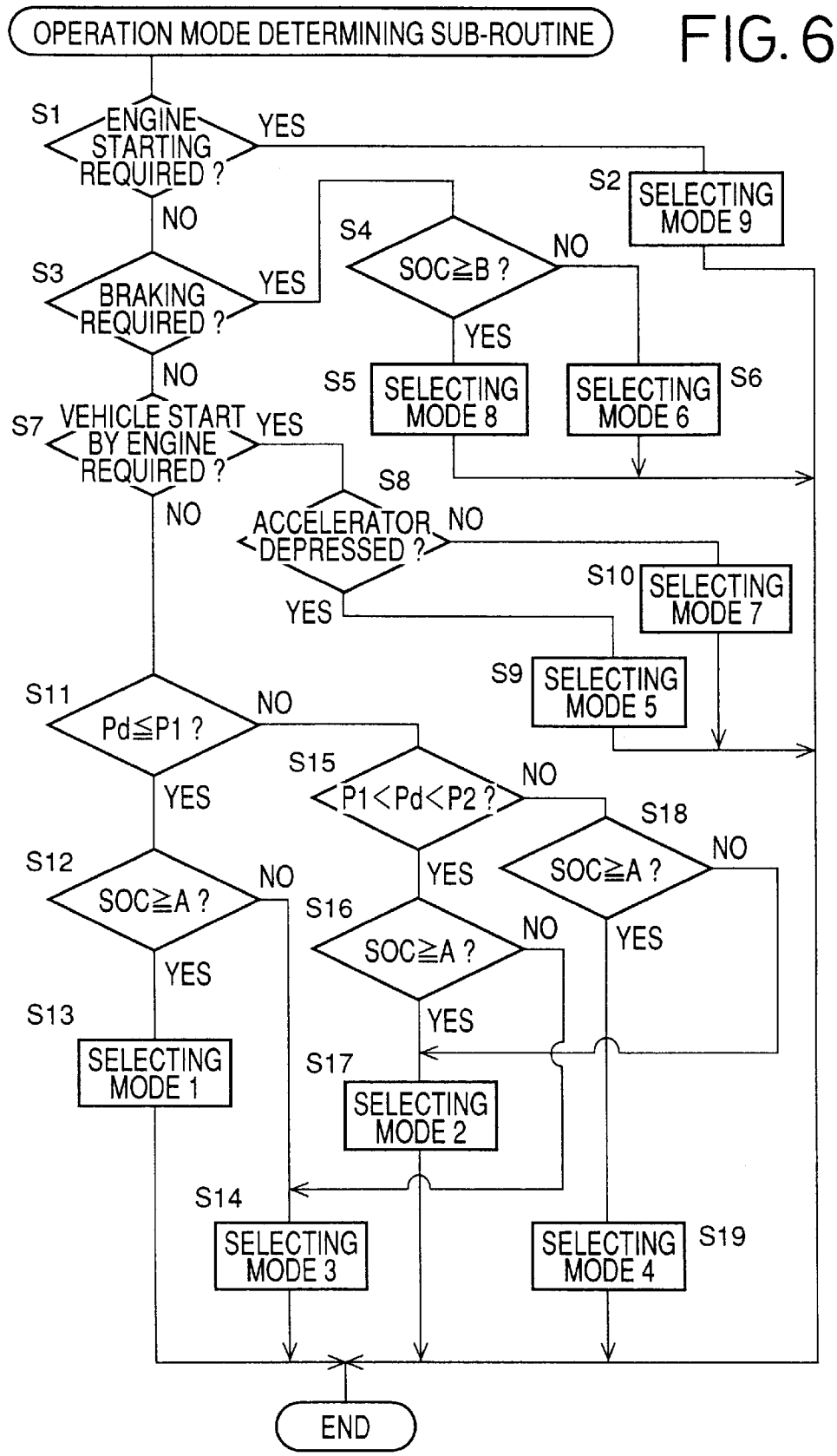
FIG. 6 is a flow chart illustrating an operation of the control system of the hybrid drive system of FIG. 1.

The operation mode determining sub-routine of FIG. 6 is initiated with step S1 to determine whether there exists a command requiring the engine 10 to be started for driving the vehicle with the engine 10 used as the drive power source or for operating the motor/generator 12 for charging the electric energy storage device 114. If an affirmative decision (YES) is obtained in step S1, the control flow goes to step S2 to select an operation mode 9. In this operation mode 9, the first and second clutches 16 and 20 are both engaged (turned ON) as indicated in TABLE 1, and the motor/generator 12 is operated to start the engine 10 through the planetary gear device 14, with the fuel injection amount and other conditions of the engine 10 being suitably controlled. When this operation mode 9 is selected while the vehicle is stationary, the starting of the engine is effected with the automatic transmission 26 placed in the neutral position. When the operation mode 9 is selected during running of the vehicle with only the motor/generator 12 as the drive power source as in an operation mode 1 in which the first clutch 16 is in the released state, the first clutch 16 is engaged, and the motor/generator 12 is operated so as to provide an output larger than the output necessary to drive the vehicle by a given surplus amount, so that the engine 10 is started by the surplus output of the motor/generator 12. Thus, even when the vehicle is running, the engine 10 can be started in the operation mode 9 by temporarily placing the automatic transmission 26 in the neutral position. The operation mode 9 eliminates an exclusive starter such as an electric motor provided for the sole purpose of starting the engine, and is therefore effective to reduce the required number of components of the hybrid drive system 8, leading to an according reduced cost of manufacture thereof.

It will be understood that a portion of the control device 110 assigned to implement step S2 constitutes ninth operation mode control means for controlling the hybrid drive system 8 in a ninth operation mode which is the operation mode 9 described above.

If a negative decision (NO) is obtained in step S1, that is, if no command requiring the starting of the engine 10 is present, the control flow goes to step S3 to determine whether brake application to the vehicle is required. This determination may be effected by determining whether a braking system of the vehicle is activated (a brake pedal is depressed) or not, or whether an engine braking is required or not, or whether the operation amount $\theta_{AC}$ of the accelerator pedal during running of the vehicle is zero. The determination as to whether the engine braking is required may be effected by determining whether the currently selected position $L_{SH}$ of the shift lever is a low-speed position such as "L" or "2" in which an engine brake or regenerative braking is generally applied, while at the same time the operation amount $\theta_{AC}$ of the accelerator pedal is zero. If an affirmative decision (YES) is obtained in step S3, the control flow goes to step S4 to determine whether the amount of electric energy SOC stored in the electric energy storage device 114 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 114 is permitted to be charged. The upper limit B is determined depending upon the charging and discharging efficiencies of the electric energy storage device 114. For instance, the upper limit B is about 80% of the full capacity of the electric energy storage device 114.

In the operation mode 8 selected in step S5, the first and second clutches 16, 20 are both engaged (turned ON), as indicated in TABLE 1, and the motor/generator 12 is placed in the NON-LOAD state. Further, the engine 10 is turned OFF, that is, the throttle valve is closed and the fuel injection amount is zeroed. As a result, an engine brake due to the drag resistance of the engine 10 is applied to the vehicle, whereby the required amount of operation of the brake pedal by the vehicle operator is reduced, facilitating the control of the vehicle running. Since the motor/generator 12 is placed in the NON-LOAD state and permitted to rotate freely in the operation mode 8, the electric energy storage device 114 is protected from excessive charging and resulting deterioration of its charging and discharging efficiencies.

It will be understood that a portion of the control device 110 assigned to implement step S5 constitutes eighth operation mode control means for controlling the hybrid drive system 8 in an eighth operation mode which is the operation mode 8 described above.

In the operation mode 6 selected in step S6, the first clutch 16 is released (turned off) and the second clutch 20 is engaged (turned ON), while the engine 10 is turned OFF, and the motor/generator 12 is placed in the CHARGING state, as indicated in TABLE 1, whereby the motor/generator 12 is driven by a kinetic energy of the motor vehicle, so as to charge the electric energy storage device 114 while applying a regenerative brake to the vehicle. Like the engine braking, the regenerative braking reduces the required amount of operation of the brake pedal and facilitates the control of the vehicle running. Since the engine 10 is disconnected from the planetary gear device 14 with the first clutch 16 placed in the released state, the energy loss of the vehicle due to the drag resistance of the engine 10 is prevented in the operation mode 6. Further, the operation mode 6 is selected when the stored electric energy amount SOC is smaller than the upper limit B, the electric energy storage device 114 is protected from excessive charging and resulting deterioration of its charging and discharging efficiencies.

It will be understood that a portion of the control device 110 assigned to implement step S6 constitutes sixth operation mode control means for controlling the hybrid drive system 8 in a sixth operation mode which is the operation mode 6 described above.

If a negative decision (NO) is obtained in step S3, that is, if no command requiring brake application to the vehicle is present, the control flow goes to step S7 to determine whether the vehicle is required to be started by operation of the engine 10. This determination may be effected by determining whether the vehicle is in a temporary stop during running of the vehicle with the engine 10 used as the drive power source as in an operation mode 3 (which will be described). For instance, the temporary stopping of the vehicle can be detected by checking if the output speed No of the automatic transmission 26 is zero. Namely, the output speed No is zero when the vehicle is stationary. If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch 16 is engaged (turned ON) and the second clutch 20 is released (turned OFF), and the engine 10 is operated, as indicated in TABLE 1, whereby the vehicle is started by the engine 10, with the regenerative braking torque of the motor/generator 12 being suitably controlled. Described in detail, the ratios of the engine torque $T_E$, output torque of the planetary gear device 14 and motor torque $T_M$ are 1:(1+ρ):ρ, where ρ represents a gear ratio of the planetary gear device 14 (ρ=number of teeth of the sun gear 14s/number of teeth of the ring gear 14r). When the gear ratio ρ is about 0.5 (as in a common planetary gear device), for example, the torque of the motor/generator 12 is controlled to be equal to a half of the engine torque $T_E$, so that the torque about 1.5 times the engine torque $T_E$ is produced from the carrier 14c of the planetary gear device 14. In other words, the vehicle is started with a torque as large as (1+ρ)/ρ times the torque of the motor/generator 12. If the motor/generator 12 is held in the NON-LOAD state with no current applied to the motor, the output of the carrier 14c is zeroed with the rotor shaft 56 merely rotating in the reverse direction, whereby the vehicle is held stationary. In this case, the planetary gear device 14 functions as a vehicle start clutch and a torque booster. With the motor torque $T_M$ (regenerative braking torque) gradually increased from zero to increase a reaction force of the motor/generator 12, the vehicle can be smoothly started with the output torque which is (1+ρ) times the engine torque $T_E$.

It will be understood that a portion of the control device 110 assigned to implement step S9 constitutes fifth operation mode control means for controlling the hybrid drive system 8 in a fifth operation mode which is the operation mode 5 described above.

The motor/generator 12 used in the hybrid drive system 8 of the present embodiment has a torque capacity which is about ρ times the maximum torque of the engine 10. Namely, the torque capacity and size of the motor/generator 12 are minimized to minimize the size and cost of manufacture of the hybrid drive system 8, while assuring the required torque. The present hybrid drive system 8 is further adapted so that the opening angle of the throttle valve and the fuel injection amount are increased with an increase in the motor torque $T_M$, for preventing stalling of the engine 10 due to a drop of the engine speed $N_E$ due to an increase in the reaction force of the motor/generator 12.

In the operation mode 7 selected in step S10, the first clutch 16 is engaged (turned ON) and the second clutch 20 is released (turned OFF), and the engine 10 is operated while the motor/generator 12 is placed in the NON-LOAD state so that the hybrid drive system 8 is placed in an electrically neutral state, as indicated in TABLE 1. In this operation mode 7, the output of the carrier 14c is zeroed with the rotor shaft 56 of the motor/generator 12 rotating freely in the reverse direction. When this operation mode 7 is established during running of the vehicle with the engine 10 as the drive power source as in the operation mode 3, the stopping of the vehicle does not require the engine 10 to be turned OFF, and the vehicle can be started by the engine 10 as in the operation mode 5.

It will be understood that a portion of the control device 110 assigned to implement step S10 constitutes seventh operation mode control means for controlling the hybrid drive system 8 in a seventh operation mode which is the operation mode 7 described above.

If a negative decision (NO) is obtained in step S7, that is, if the starting of the vehicle by the engine 10 is not required, the control flow goes to step S11 to determine whether a currently required output Pd of the hybrid drive system 8 is equal to or smaller than a predetermined first threshold valve P1. The currently required output Pd is an output of the hybrid drive system 8 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, or the currently established operating position of the automatic transmission 26. The accelerator operation amount $\theta_{AC}$ per se may be used as the currently required output Pd. The predetermined first threshold value P1 is a boundary value of the output above which the vehicle is driven with only the engine 10 used as the drive power source and below which the vehicle is driven with only the motor/generator 12 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 114 may be charged by operation of the engine 10). If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3. The lower limit A is a lower limit of the stored electric energy amount SOC above which the electric energy stored in the storage device 114 can be used to operate the motor/generator 12 as the drive power source. The lower limit A is determined depending upon the charging and discharging efficiency of the storage device 114. For instance, the lower limit A is about 70% of the full capacity of the storage device 114.

In the operation mode 1 selected in step S13, the first clutch 16 is released (turned OFF) and the second clutch is engaged (turned ON), and the engine 10 is turned OFF, while the motor/generator 12 is operated so as to provide the currently required output Pd, as indicated in TABLE 1, so that the vehicle is driven with only the motor/generator 12 used as the drive power source. In this operation mode 1, too, the engine 10 is disconnected from the planetary gear device 14, so that the energy loss due to the drag resistance of the engine 10 is prevented as in the operation mode 6, and the motor can be suitably operated with high efficiency with the automatic transmission 26 being suitably shifted.

It will be understood that a portion of the control device 110 assigned to implement step S13 constitutes first operation mode control means for controlling the hybrid drive system 8 in a first operation mode which is the operation mode 1 described above.

It is also noted that the operation mode 1 is selected, that is, the motor/generator 12 is used as the drive power source, when the currently required output Pd is equal to or smaller than the first threshold value P1 while the electric energy amount SOC in the storage device 114 is equal to or larger than the lower limit A. In this condition, the energy efficiency is higher and the fuel consumption and the amount of exhaust emissions can be made smaller when the vehicle is driven by the motor/generator 12 (in the operation mode 1) than when the vehicle is driven by the engine 10 (as in operation mode 2). Further, the electric energy storage device 114 is protected from excessive discharging with the stored energy amount SOC falling below the lower limit A, which would result in deterioration of the charging and discharging efficiencies of the storage device 114.

In the operation mode 3 selected in step S14, the first and second clutches 16, 20 are both engaged (turned ON), and the engine 10 is turned ON, while the motor/generator 12 is placed in the CHARGING state to charge the electric energy storage device 114 with regenerative braking, as indicated in TABLE 1, whereby the vehicle is driven by the output of the engine 10 while the electric energy storage device 114 is charged with the electric energy generated by the motor/generator 12. In this operation mode 3, the engine 10 is operated so as to provide an output larger than the currently required output Pd, and the electric current of the motor/generator 12 is controlled so that a surplus output of the engine 10 is consumed by the motor/generator 12 to charge the storage device 114.

It will be understood that a portion of the control device 110 assigned to implement step S14 constitutes third operation mode control means for controlling the hybrid drive system 8 in a third operation mode which is the operation mode 3 described above.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P2 P1 and smaller than the second threshold, namely, within a predetermined range between P1 and P2. This second threshold value P2 is a boundary value of the output below which the vehicle is driven with only the engine 10 used as the drive power source and above which the vehicle is driven with both the engine 10 and the motor/generator 12 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 114 may be charged by operation of the engine 10). If the currently required output Pd is larger than the first threshold P1 and smaller than the second threshold P2, that is, if an affirmative decision (YES) is obtained in step S15, the control flow goes to step S16 to determine whether the stored electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above. If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches 16, 20 are both engaged (turned ON), and the engine 10 is operated so as to produce the currently required output Pd, while the motor/generator 12 is placed in the NON-LOAD state, as indicated in TABLE 1, whereby the vehicle is driven with only the engine 10 used as the drive power source.

It will be understood that a portion of the control device 110 assigned to implement step S17 constitutes second operation mode control means for controlling the hybrid drive system 8 in a second operation mode which is the operation mode 2 described above.

In the operation mode 4 selected in step S19, the first and second clutches 16, 20 are both engaged (turned ON), and the engine 10 and the motor/generator 12 are operated, as indicated in TABLE 1, whereby the vehicle is driven with both the engine 10 and the motor/generator 12 used as the drive power sources.

It will be understood that a portion of the control device 110 assigned to implement step S19 constitutes fourth operation mode control means for controlling the hybrid drive system 8 in a fourth operation mode which is the operation mode 4 described above. In this operation mode 4 selected when the currently required output Pd is equal to the second threshold P2 or larger, the engine 10 and the motor/generator 12 are both operated as the drive power sources to drive the vehicle, so that the energy efficiency is less likely to be lowered than in the operation mode 1 or 2 in which either the engine 10 or the motor/generator 12 is used as the drive power source. In this respect, the fuel consumption and the exhaust gas emission can be made lower in this operation mode 4 than in the operation mode 1 or 2 when the currently required output Pd is equal to P2 or larger. Further, since the operation mode 4 is selected only when the stored electric energy amount SOC is equal to or larger than the lower limit A, the electric energy storage device 114 is protected from excessive discharging with the stored energy amount SOC falling below the lower limit A, which would result in deterioration of the charging and discharging efficiencies of the storage device 114.

As described above, the operation modes 1–4 are selected in the following running states of the vehicle. When the electric energy amount SOC stored in the electric energy storage device 114 is not smaller than the lower limit A, the operation mode 1 is selected in step S13 to drive the vehicle with only the motor/generator 12 as the drive power source if the vehicle is in the low-load running state with the currently required output Pd being equal to or smaller than the first threshold P1. Further, the operation mode 2 is selected in step S17 to drive the vehicle with only the engine 10 as the drive power source if the vehicle is in the medium-load running state with the currently required output Pd being larger than the first threshold P1 and smaller than the second threshold P2, and the operation mode 4 is selected in step S19 to drive the vehicle with both of the engine 10 and the motor/generator 12 as the drive power sources if the vehicle is in the high-load running state with the currently required output Pd being equal to or larger than the second threshold P2. When the stored electric energy amount SOC is smaller than the lower limit A, the operation mode 3 is selected in step S14 to drive the vehicle with only the engine 10 as the drive power source while at the same time charging the electric energy storage device 114 if the vehicle is in the medium-load running state with the currently required output Pd being smaller than the second threshold P2, and the operation mode 2 is selected in step S17 to drive the vehicle with only the engine 10 without charging the storage device 114 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 10 than when the vehicle is driven by the motor/generator 12. Accordingly, the fuel consumption and exhaust gas emission can be made smaller in the operation mode 2 than in the operation mode 1. In the high-load running state, it is generally desirable to select the operation mode 4 in which the vehicle is driven by both of the engine 10 and the motor/generator 12. When the electric energy amount SOC stored in the electric energy storage device 114 is smaller than the lower limit A, however, it is desirable to select the operation mode 2, that is, to drive the vehicle with only the engine 10 used as the drive power source, in order to prevent deterioration of the charging and discharging efficiencies of the storage device 114 due to reduction of the stored electric energy amount SOC below the lower limit A.

In the hybrid drive system 8 according to the present embodiment described above, the engine 10 is connected to the ring gear 14r of the planetary gear device 14 through the first clutch 16, and the second clutch 20 is disposed between the sun gear 14s and a series connection of the first clutch 16 and the carrier 14c. In this arrangement, the motor/generator 12 performs various functions depending upon the operating states of the first and second clutches 16, 20, that is, depending upon whether these clutches 16, 20 are engaged or released. Accordingly, the hybrid drive system 8 can be operated in the nine different operation modes 1–9 listed in TABLE 1, depending upon the specific running condition of the vehicle. For instance, the first clutch 16 is placed in the released state (OFF state) in the operation mode 1 (MOTOR DRIVE mode) or in the operation mode 6 (REGENERATIVE BRAKING mode), so that the engine 10 is disconnected from the planetary gear device 14, and the energy loss due to a drag resistance of the engine 10 is prevented, assuring improved energy efficiency of the hybrid drive system 8.

In the present hybrid drive system 8, the single motor/generator 12 serves as a sole drive power source in the operation mode 1 (MOTOR DRIVE mode), as an auxiliary drive power source in addition to the engine 10 in the operation mode 4 (ENGINE-MOTOR DRIVE mode), as an electric generator for charging the electric energy storage device 114 in the operation mode 3 (ENGINE DRIVE+ CHARGE mode), and as an electric generator for applying a regenerative braking force to the vehicle in the operation mode 6 (REGENERATIVE BRAKING mode). Thus, the present hybrid drive system 8 does not require a separate electric generator for charging the storage device 114 and applying a regenerative brake, in addition to an electric motor for driving the vehicle, and is accordingly simplified in construction and available at a reduced cost.

The present hybrid drive system 8 is also advantageous in respect of its radial and axial dimensions. That is, the diameter of the sprocket 18 is made comparatively small while the diameter of the ring gear 50 of the differential gear device 48 is made comparatively large, for effective boosting of torque. In the hybrid drive system 8, the sprocket 18 and the ring gear 50 are disposed at substantially the same axial position, while the planetary gear device 14 and the differential case 62 which have comparatively medium diameters are disposed at substantially the same axial position. Further, the flywheel 22 having a comparatively large diameter and the bearing 64 having a comparatively small diameter are disposed at substantially the same axial position. In this arrangement, the first axis O1 with which the engine 10 and the motor/generator 12 are aligned and the fourth axis O4 with which the differential gear device 48 is aligned are located comparatively close to each other in the radial direction, as indicated in FIG. 4, and the axial dimension of the hybrid drive system 8 is also considerably shortened. Thus, the hybrid drive system 8 is small-sized and compact.

The second clutch 20 is located on the left side of the motor/generator 12 (as viewed in FIG. 2), and the motor/generator 12 having a comparatively large diameter and the shift gear portion 60 having a comparatively small diameter are disposed at substantially the same axial position. Further, the second clutch 20 and the forward-drive frictionally coupling clutches 36, 38 are disposed at substantially the same axial position, while the first clutch 16 and the planetary gear device 14 are disposed at substantially the same position as the reverse-drive frictional coupling clutch 44. Consequently, the first axis O1, second axis O2 (axis of the automatic transmission 26) and third axis O3 is located comparatively close to each other in the radial direction, and the axial dimension of the hybrid drive system 8 is also shortened, leading to the compact arrangement of the hybrid drive system. Since the frictionally coupling portions of the two clutches 36, 38 are located at substantially the same axial positions, the axial dimensions of these clutches 36, 38 are considerably reduced. The required engagement torque of the second clutch 20 is comparatively small, since the sun gear 14s and the carrier 14c which are connected by the second clutch 20 have comparatively small diameters.

Accordingly, the diameter of the second clutch 20 can be made comparatively small. Therefore, the second clutch 20 will not interfere with the frictionally coupling portion of the clutch 36 having a relatively large diameter larger than that of the clutch 38 which is disposed radially outwardly of the clutch 36.

The differential gear device 48 is disposed on the right side of the sprocket 18, that is, on one side of the sprocket 18 remote from the motor/generator 12 and the shift gear portion 60 of the automatic transmission 26. Accordingly, the fourth axis O4 can be located close to the third axis O3. In the present embodiment wherein the chain 30 is used for connecting the sprocket 18 and the driven sprocket 28, the sprocket 18 is not subject to thrust forces and can therefore be supported by a simple bearing, that is, by the needle bearing 67. This arrangement is effective to further reduce the axial dimension of the assembly on the first axis O1.

As explained above, the four axes O1–O4 of the present hybrid drive system 8 are located close to each other in the radial direction, and the axial dimensions of the assemblies on these four axes O1–O4 are also considerably reduced. Thus, the overall dimensions of the hybrid drive system 8 in the longitudinal and transverse directions of the motor vehicle are comparatively small, whereby the present hybrid drive system 8 can be made compact and installed on the vehicle with a high degree of freedom.

In addition, the second space 71 in which the motor/generator 12 is accommodated is fluid-tightly sealed by the oil seals 90, 92, so that the stator and rotor of the motor/generator 12 are protected from exposure to the lubricant which may contain iron particles and other foreign matters, and accordingly have a high degree of operational reliability.

In the present hybrid drive system 8, the first and second clutches 16, 20 are spaced apart from each other by a relatively large distance. In this respect, it is noted that the oil passage 104 for supplying the working fluid to the first clutch 16 is provided in the covering member 66 while the oil passage 106 for supplying the working fluid to the second clutch 20 is provided in the covering member 76. This arrangement facilitates the formation of the oil passages 104, 106.

The second axis O2 which is the axis of the first shaft 32 of the automatic transmission 26 is located above and rearwardly of the first axis O1 (as seen in the longitudinal direction of the vehicle), and the third axis O3 which is the axis of the second shaft 34 is located below and rearwardly of the second axis O2. Further, the fourth axis O4 which is the axis of the differential gear device 48 is located below the third axis O3. That is, the fourth axis O4 is the lowest: axis of the four axes O1–O4. In the present arrangement, a space is left above the first axis O1, that is, above the engine 10 and the motor generator 12, and the motor/generator controller 112 and the electric energy storage device 114 can be accommodated in this space. Since the automatic transmission 26 is located rearwardly of the engine 10 and the motor/generator 12, a sufficient space may be provided in front of the engine 10 and the motor/generator 12, so that this sufficient space can be used to absorb a shock upon application of a force to the engine and motor/generator in the rearward direction of the vehicle.

There will be described other embodiments of this invention. The same reference numerals as used in the first embodiments will be used to identify the functionally corresponding elements, and redundant description of these elements will not be provided in the interest of brevity and simplification of the description.

Figure 7:
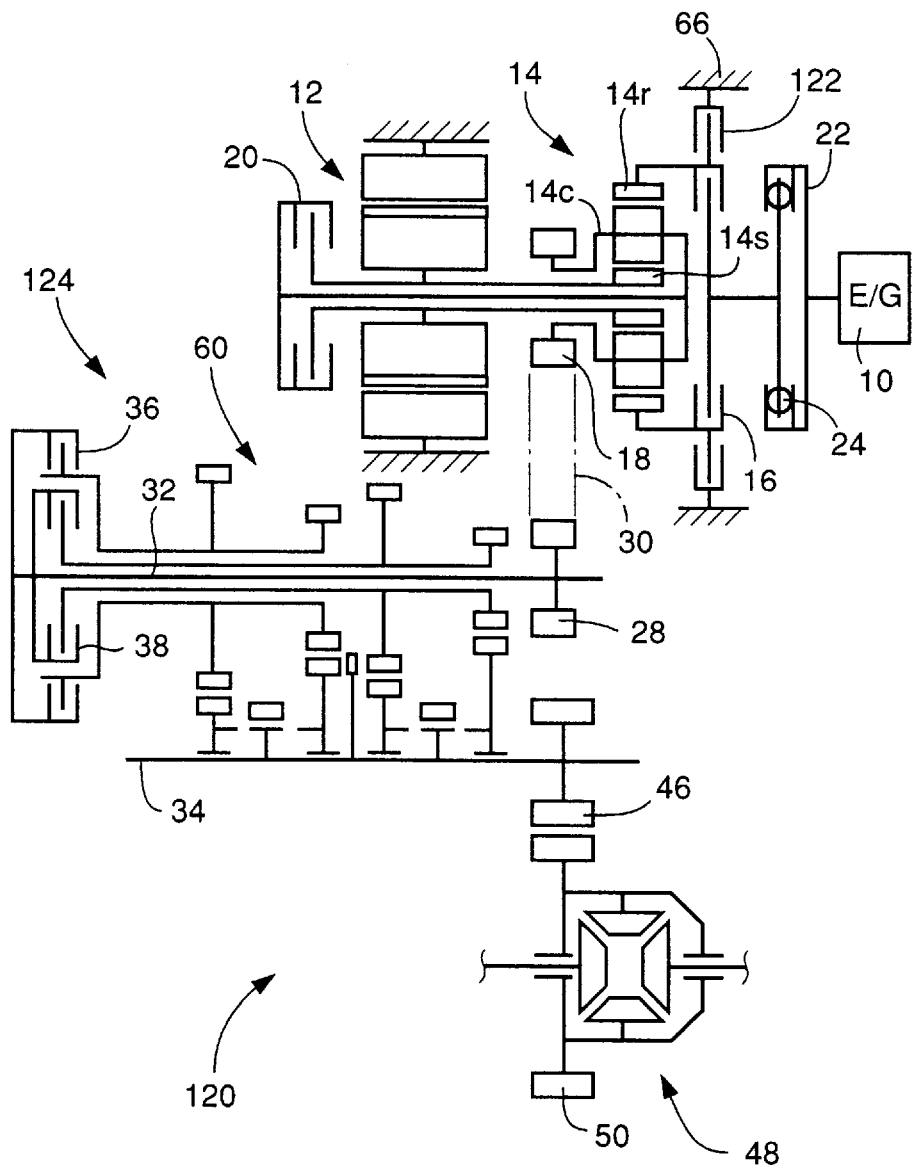
FIG. 7 is a schematic view illustrating a general arrangement of a hybrid drive system according to another embodiment of this invention.

Referring to FIG. 7 corresponding to that of FIG. 1, there is illustrated a hybrid drive system 120 constructed according to a second embodiment of this invention. This hybrid drive system 120 is provided with a hydraulically operated brake 122 for fixing the ring gear 14r of the planetary gear device 14 to the covering member 66, to thereby prevent rotation of the ring gear 14r. The hybrid drive system 120 uses an automatic transmission 124 which is identical with the automatic transmission 26, except for the elimination of the reverse gear train 61. That is, the hybrid drive system 120 is identical with the hybrid drive system 8, except for the provision of the brake 122 and the elimination of the reverse gear train 61 in the present embodiment. The brake 122 is engaged and released by a hydraulic actuator under the control of the control device 110 shown in FIG. 5.

Figure 8:
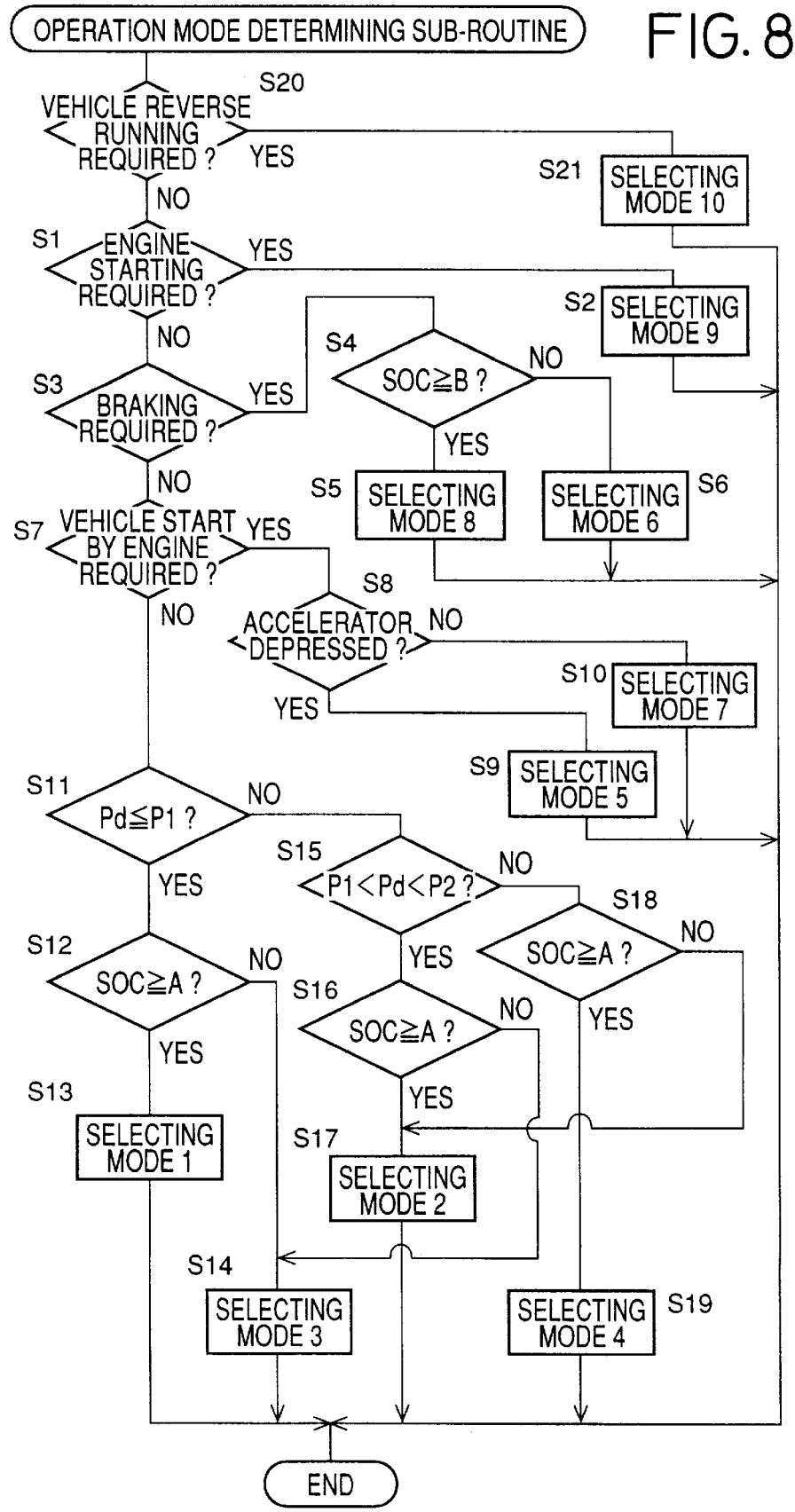
FIG. 8 is a flow chart illustrating an operation of a control system of the hybrid drive system of FIG. 7.

In the present hybrid drive system 120, the operation modes 1–9 described above are established when the brake 122 is placed in the released (OFF) state, while an additional operation mode 10 is established when the brake 122 is placed in the engaged (ON) state, as indicated in TABLE 2. In the operation mode 10, the first and second clutches 16, 20 are both released (turned OFF), and the brake 122 is engaged (turned ON), with the engine 10 held OFF, while the motor/generator 12 is operated in the reverse direction to drive the vehicle in the backward direction. The operation mode 10 is selected in step S21 of an operation mode determining sub-routine illustrated in the flow chart of FIG. 8, if an affirmative decision (YES) is obtained in step S20, that is, if there is present a command requiring the vehicle to run in the backward or reverse direction. The determination in step S20 may be effected by determining whether the shift lever is shifted to a reverse position "R". In the operation mode 10 in which the engine 10 is off, the first clutch may be placed in the engaged or ON position.

motor/generator 12. Where the gear ratio ρ of the planetary gear device 14 is about 0.5, the output torque of the carrier 14c is boosted about 3 times the torque of the motor/generator 12. Therefore, the motor/generator 12 can be used to start or effect backward running of the vehicle even on an uphill road.

It will be understood that a portion of the control device 110 assigned to implement step S21 constitutes tenth operation mode control means for controlling the hybrid drive system 8 in a tenth operation mode which is the operation mode 10 described above.

The hybrid drive system 120 may be modified such that the motor/generator 12 is operated in the forward direction, rather than in the reverse direction, in the operation mode 10. In other words, the hybrid drive system 120 may have art operation mode 11 which is identical with the operation mode 10 except that the motor/generator 12 is operated in the forward direction. In this case, the vehicle can be started or driven in the forward direction with only the motor/generator 12 used as the drive power source, at a relatively high torque boosting ratio as described above.

Figure 9:
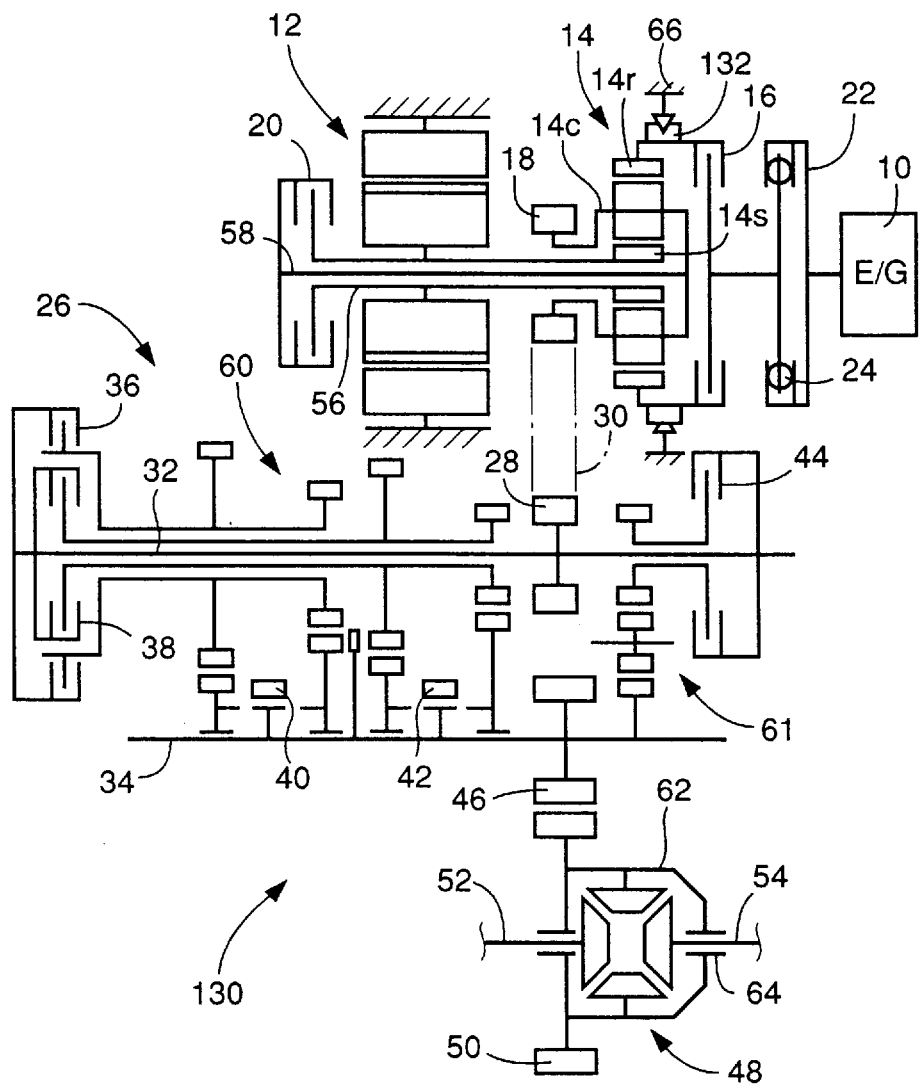
FIG. 9 is a schematic view illustrating a general arrangement of a hybrid drive system according to a further embodiment of the invention.

Referring to FIG. 9, there is illustrated a hybrid drive system 130 constructed according to a third embodiment of this invention. In this hybrid drive system 130, a one-way clutch 132 is provided between the ring gear 14r of the planetary gear device 14 and the covering member 66. The one-way clutch 132 permits rotation of the ring gear 14r in the same direction as the engine 10, but inhibits rotation of the ring gear 14r in the opposite direction. With the "lock" function of the one-way clutch 132, the present hybrid drive system 130 has an additional operation mode 10' similar to the operation mode 10, as well as the operation modes 1–9,

TABLE 2

| MODE | CLUTCHES 16 | 20 | ENGINE 10 | BRAKE 122 | STORAGE DEVICE 114 | MODE NOMENCLATURE |
|---|---|---|---|---|---|---|
| 1 | OFF | ON | OFF | OFF | DISCHARGED | MOTOR DRIVE |
| 2 | ON | ON | ON | OFF | NO ENG. CSMD | ENGINE DRIVE |
| 3 | ON | ON | ON | OFF | CHARGED | ENGINE DRIVE + CHARGE |
| 4 | ON | ON | ON | OFF | DISCHARGED | ENGINE · MOTOR DRIVE |
| 5 | ON | OFF | ON | OFF | CHARGED | VEHICLE START BY ENGINE |
| 6 | OFF | ON | OFF | OFF | CHARGED | REGENERATIVE BRAKING |
| 7 | ON | OFF | ON | OFF | NO ENG. CSMD | ELECTRIC NEUTRALITY |
| 8 | ON | ON | OFF | OFF | NO ENG. CSMD | ENGINE BRAKING |
| 9 | ON | ON | START | OFF | DISCHARGED | ENGINE STARTING |
| 10 | OFF | OFF | OFF | ON | DISCHARGED | VEHICLE START BY MOTOR IN REVERSE DIRECTION |

In TABLE 2, "NO ENG. CSMD" in the column of the storage device 114 means that no electric energy stored in the storage device 114 is consumed.

In the present second embodiment wherein the no reverse gear train is provided in the automatic transmission 124, the reverse running of the vehicle is always effected by the reverse operation of the motor/generator 12. The output torque of the carrier 14c is (1+θ)/θ times the torque of the as indicated in TABLE 3. The operation mode 10' is selected to start or drive the vehicle with the motor/generator 10 in the forward direction at a relatively high torque boosting ratio. However, the motor/generator 12 cannot not be used to start or drive the vehicle in the backward direction, and the automatic transmission 26 is provided with the reverse gear train 61.

TABLE 3

| MODE | CLUTCHES 16 | 20 | ENGINE CLUTCH 10 | STORAGE 132 | DEVICE 114 | MODE NOMENCLATURE |
|---|---|---|---|---|---|---|
| 1 | OFF | ON | OFF | FREE | DISCHARGED | MOTOR DRIVE |
| 2 | ON | ON | ON | FREE | NO ENG. CSMD | ENGINE DRIVE |
| 3 | ON | ON | ON | FREE | CHARGED | ENGINE DRIVE + CHARGE |
| 4 | ON | ON | ON | FREE | DISCHARGED | ENGINE · MOTOR DRIVE |
| 5 | ON | OFF | ON | FREE | CHARGED | VEHICLE START BY ENGINE |
| 6 | OFF | ON | OFF | FREE | CHARGED | REGENERATIVE BRAKING |
| 7 | ON | OFF | ON | FREE | NO ENG. CSMD | ELECTRIC NEUTRALITY |
| 8 | ON | ON | OFF | FREE | NO ENG> CSMD | ENGINE BRAKING |
| 9 | ON | ON | START | FREE | DISCHARGED | ENGINE STARTING |
| 10' | OFF | OFF | OFF | LOCK | DISCHARGED | VEHICLE START BY MOTOR IN FORWARD DIRECTION |

In TABLE 3, "NO ENG. CSMD" in the column of the storage device 114 means that no electric energy stored in the storage device 114 is consumed.

The hybrid drive system 130 does not require controlling the one-way clutch 132, unlike the hybrid drive system 120 of FIG. 7 which requires controlling the engaging and releasing actions of the brake 130. In this respect, the present hybrid drive system 130 is less likely to suffer from a hydraulic or electric failure and has higher operational reliability.

If the first and second clutches 16, 20 are both engaged (ON) due to some hydraulic failure, for example, the operation modes 2, 3, 4, 8 and 9 are available, and the vehicle is prevented from moving down on an uphill road since the one-way clutch 132 is placed in the LOCK state. If the first clutch 16 is engaged (ON) while the second clutch 20 is released (OFF) due to some hydraulic failure, the operation mode 5 is available with the one-way clutch 132 placed in the FREE state, and the operation mode 10 ' is available with the one-way clutch 132 placed in the LOCK state. If the first clutch 16 is released (OFF) while the second clutch 20 is engaged (ON) due to some hydraulic failure, the operation modes 1 and 6 are available with the one-way clutch 132 placed in the FREE state, and the vehicle is prevented from moving down on am uphill road with the one-way clutch 132 placed in the LOCK state.

Figure 10:
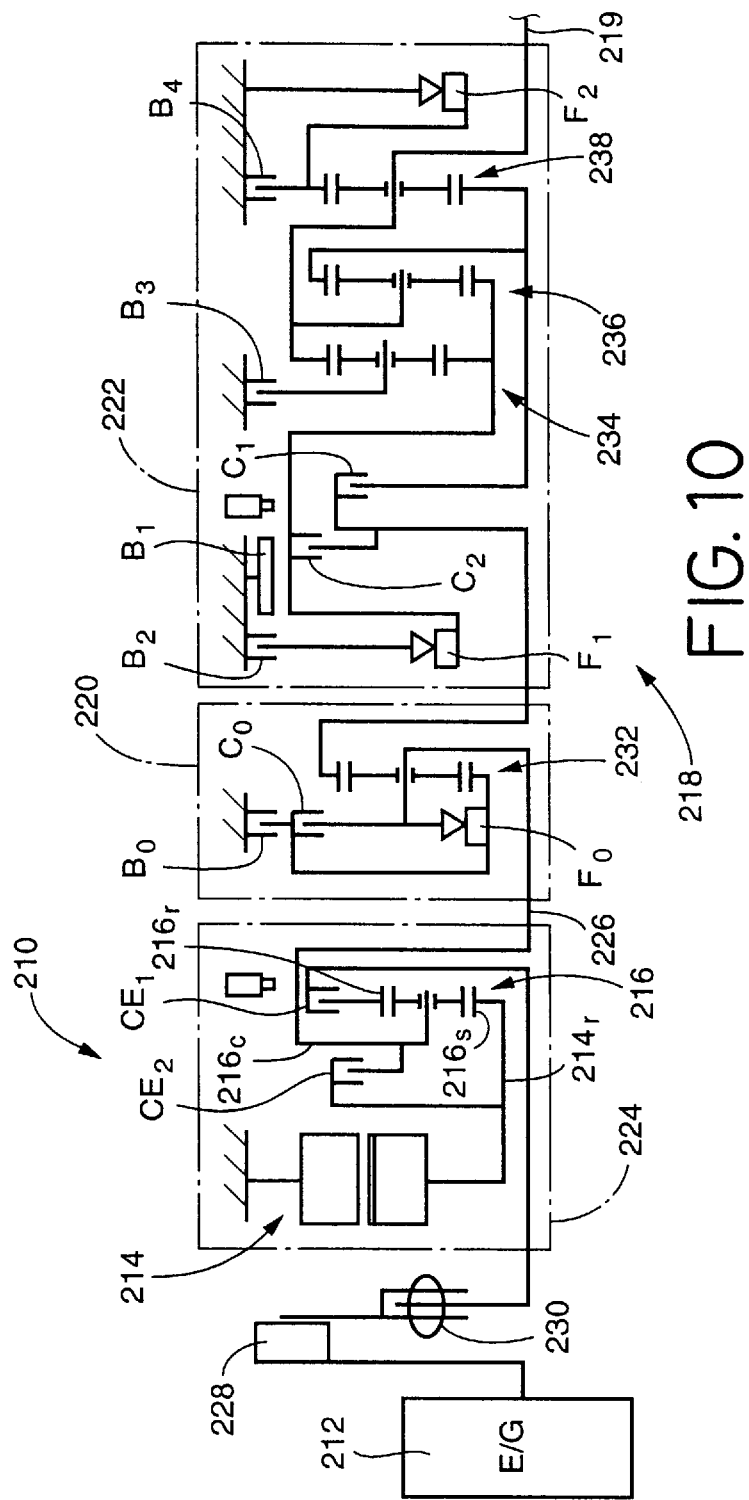
FIG. 10 is a schematic view illustrating a still further embodiment of the invention.

Referring next to FIG. 10, there is shown a hybrid drive system 210 constructed according to a fourth embodiment of this invention, for use on a front-engine rear-drive motor vehicle (F-R vehicle). The hybrid drive system 210 includes: an engine 212 such as an internal combustion engine operated by combustion of a fuel; a motor/generator 214 which functions as an electric motor operated with an electric energy, and an electric generator; a planetary gear device 216 of single pinion type; and an automatic transmission 218. These engine 212, motor/generator 214, planetary gear device 216 and automatic transmission 218 are arranged in the longitudinal direction of the motor vehicle. The automatic transmission 318 has an output shaft 219 which is operatively connected to rear right and left drive wheels of the vehicle through a propeller shaft and a differential gear device (which are not shown), to transmit a drive force to the drive wheels.

The planetary gear device 216 functions as a synthesizing/distributing mechanism for mechanically synthesizing and distributing a force, and cooperates with the motor/generator 214 to constitute an electrically controlled torque converter 224 as indicated in one-dot chain line in FIG. 10. The planetary gear device 216 includes a first rotary element in the form of a ring gear 216r connected to the engine 212 through a first clutch CE1, a second rotary element in the form of a sun gear 216s connected to a rotor shaft 214r of the motor/generator 214, and a third rotary element in the form of a carrier 216c connected to an input shaft 226 of the automatic transmission 218. The input shaft 226 functions as an output shaft of the planetary gear device 216. The gun gear 216s and the carrier 216c are connected to each other by a second clutch CE2. The first clutch CE1 functions as a clutch for connecting and disconnecting the engine 212 to and from the planetary gear device 216. The engine 212 is connected to the first clutch CE1 through a flywheel 228 and a damper 230. The flywheel 228 and the damper 230 function to absorb speed and torque variations of the engine 212. The damper 230 includes an elastic member such as a spring or a rubber member. The first and second clutches CE1, CE2 are friction type multiple-disk clutches which are engaged and released by respective hydraulic actuators.

Figure 11:
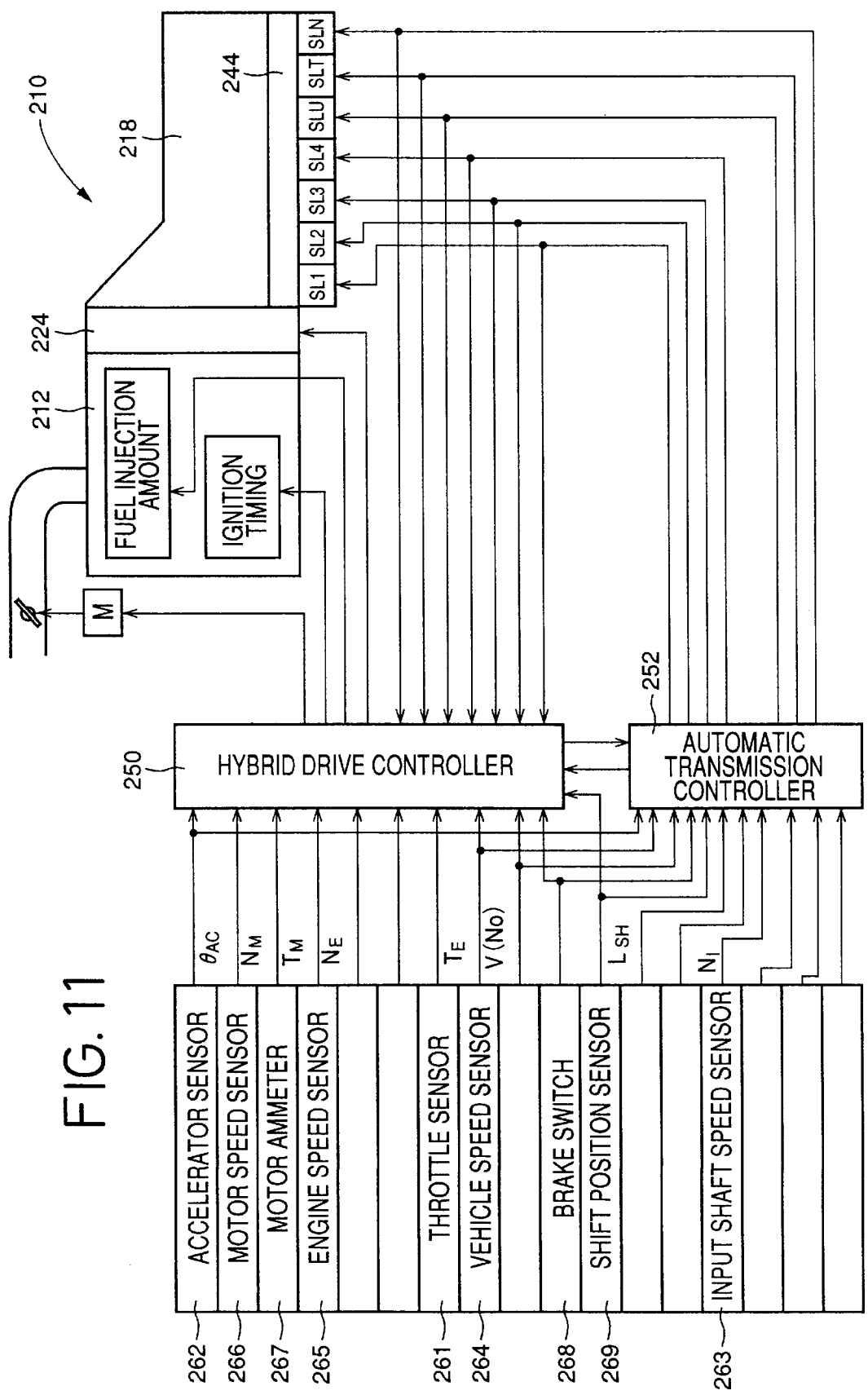
FIG. 11 is a view illustrating a control system provided in the hybrid drive system of FIG. 10.

The automatic transmission 218 is a combination of a front auxiliary transmission 220 and a rear primary transmission 222. The auxiliary transmission 220 consists of an overdrive planetary gear set 232 of single pinion type, while the primary transmission 222 consists of three planetary gear sets 234, 236, 238 connected to each other. The primary transmission 222 has four forward-drive positions and one rear-drive position. The auxiliary transmission 220 includes frictionally coupling clutch C0 and brake B0 operated by respective hydraulic actuators, and a one-way clutch F0. The primary transmission 222 includes frictionally coupling clutches C1, C2 and brakes B1, B2, B3, B4 which are operated by respective hydraulic actuators, and one-way clutches F1, F2. The automatic transmission 218 includes a hydraulic circuit 244 incorporating solenoid-operated valves SL1–SL4 as shown in FIG. 11. These solenoid-operated valves SL1–SL4 are selectively energized and deenergized to selectively engage and release the clutches C0, C1, C2, brakes B0, B1, B2, B3, B4 for selectively establishing one of operating positions of the automatic transmission 218, as indicated in FIG. 12. The operating positions consist of a neutral position "N", a reverse position "Rev", and five forward-drive positions, that is, first-speed position "1st", second-speed position "2nd", third-speed position "3rd", fourth-speed position "4th" and fifth-speed position "5th". The hydraulic circuit 244 is also controlled by a so-called manual shift valve which is mechanically connected to and operated by the shift lever, which has a neutral position "N", a reverse position "R", and drive positions "D", as also indicated in FIG. 12. For instance, the drive positions "D" include a third-speed range position "3", a second-speed range position "2" and a low-speed range position "L". In FIG. 10, the lower halves of the automatic transmission 218 and the electrically controlled torque converter 224 are not shown, since these devices 218, 224 are symmetrical with respect to their centerline.

In the table of FIG. 12, white circles indicate the engaged states of the clutches C, brakes B and one-way clutches F, while black circles indicate the engaged states of the clutch C0 and brakes B1, B4 when the shift lever is shifted to any one of the positions "3", "2" and "L" in which an engine brake may be applied to the vehicle. The absence of the white or black circles indicates the released states of the clutches C, brakes B and one-way clutches F. The neutral and reverse positions "N" and "Rev" of the automatic transmission 218 are established when the manual shift valve is placed in respective positions corresponding to the neutral and reverse positions "N" and "R" of the shift lever. When the manual shift lever is placed in any one of the positions corresponding to the drive positions "D" (including the engine braking positions "3", "2" and "L"), the automatic transmission 218 is automatically placed in an appropriate one of the five forward-drive positions "1st" through "5th" with the solenoid-operated valves SL1–SL4 being selectively controlled depending upon the running condition of the vehicle. The speed ratios of the five forward-drive positions decrease in steps from the speed ratio of the first-speed position "1st" to the speed ratio of the fifth-speed position "5th", as indicated in FIG. 12, by way of example only.

Figure 13:
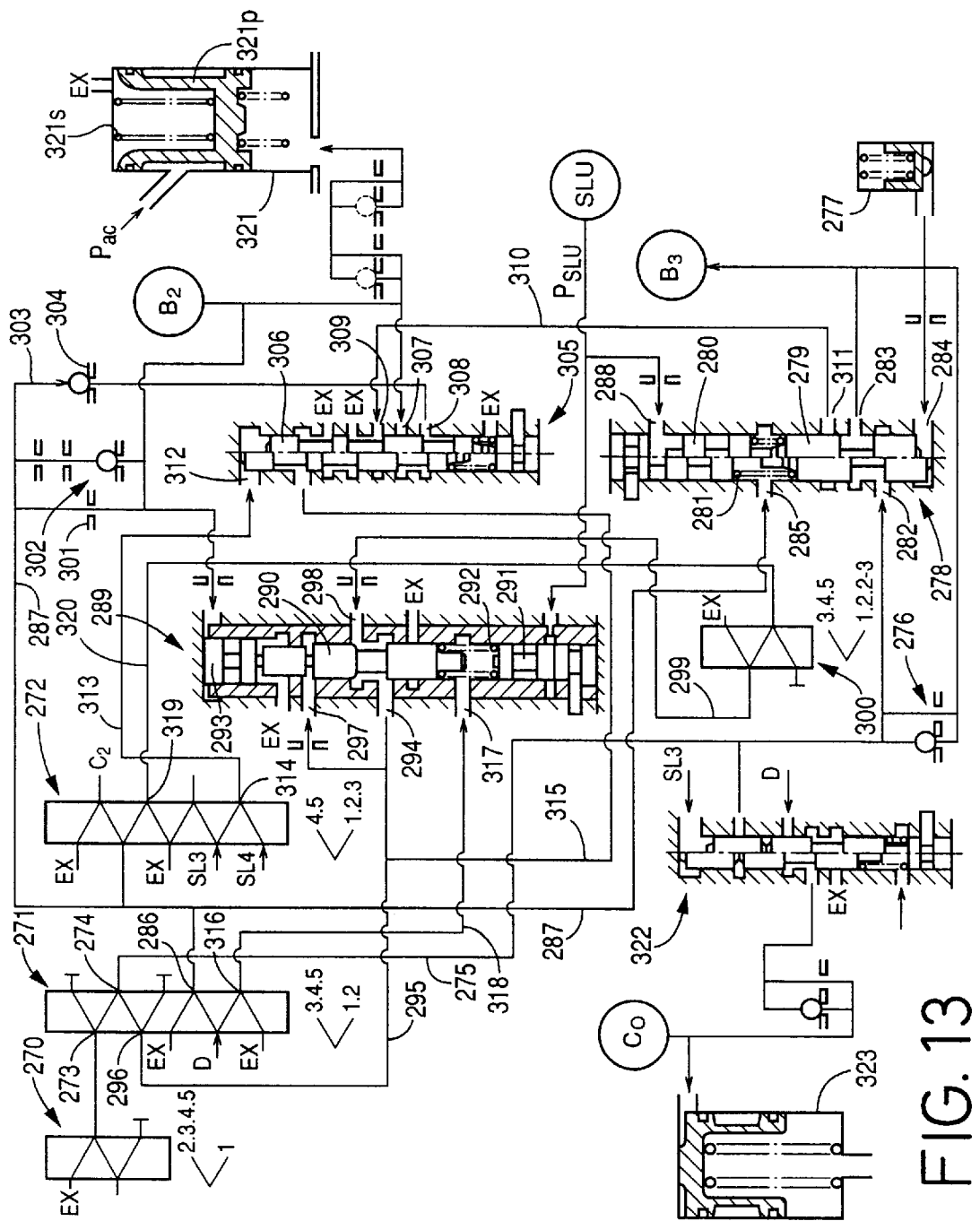
FIG. 13 is a view showing a part of a hydraulic system of the automatic transmission in the embodiment of FIG. 10.

The hydraulic circuit 244 has a circuit as shown in FIG. 13, wherein reference numerals 270, 271 and 272 denote a 1-2 shift valve, a 2-3 shift valve and a 3-4 shift valve, respectively. Working fluid communications of ports of these shift valves 270, 271, 272 in the five forward-drive positions of the automatic transmission 218 are indicated below the shift valves as shown in FIG. 13 in which the five forward-drive positions "1st", "2nd", "3rd", "4th" and "5th" are represented as "1", "2", "3", "4" and "5", respectively.

The 2-3 shift valve 271 has an input port 273 and a brake port 274 which communicate with each other when the automatic transmission 218 is placed in the first-speed position "1st" or second-speed position "2nd". The above-indicated third brake B3 is connected to the brake port 274 through an oil passage 275. The oil passage 275 has an orifice 276, and a damper valve 277 is connected between the orifice 276 and the third brake B3. The damper valve 277 functions to absorb a small amount of the working oil to thereby achieve a damping action upon an abrupt rise of the line pressure PL applied to the third brake B3.

Reference numeral 278 in FIG. 13 denotes a B-3 control valve which is provided to directly regulate the engaging pressure of the third brake B3. The B-3 control vale 278 includes a spool 279, a plunger 280, and a spring 281 disposed between the spool 279 and the plunger 280. The B-3 control valve 278 has an input port 282 which is opened and closed by the spool 279 and to which the oil passage 275 is connected, and an output port 283 which is selectively communicable with the input port 282 and to which the third brake B3 is connected. The output port 283 is connected to a feedback port 284 which is partially defined by one end of the spool 279. The B-3 control valve 278 further has a port 285 communicating with a chamber in which the spring 279 is disposed. The 2-3 shift valve 271 has a port 286 which produces a hydraulic pressure output (line pressure PL) when the automatic transmission 218 is placed in one of the forward-drive positions "3rd", "4th" and "5th". The port 286 is connected to the port 285 of the B-3 control valve 278 through an oil passage 287. The B-3 control valve 278 further has a control port 288 adjacent to one end of the plunger 280, and a linear solenoid valve SLU (FIG. 11) is connected to the control port 288, so that a pilot pressure $P_{SLU}$ generated by the linear solenoid valve SLU is applied to the control port 288. In this arrangement, the hydraulic pressure is regulated by the B-3 control valve 278, on the basis of the elastic force of the spring 281 and the hydraulic pressure applied to the port 285. The elastic force of the spring 281 increases with an increase in the pilot pressure $P_{SLU}$ applied to the control port 288.

Reference numeral 289 in FIG. 13 denotes a 2-3 timing valve which includes a spool 290, a first plunger 291, a spring 292 disposed between the spool 290 and the first plunger 291, and a second plunger 293 disposed on side of the spool 290 remote from the first plunger 291. The spool 290 has a small-diameter land and two large-diameter lands having a larger diameter than the small-diameter land. The 2-3 timing valve 289 has a port 294 formed at an intermediate position thereof. An oil passage 295 is connected to the port 294, and to a port 296 of the 2-3 shift valve 271, which port 296 is communicated with the brake port 274 when the automatic transmission 218 is placed in one of the forward-drive positions "3rd", "4th" and "5th". The oil passage 295 has a branch connected through an orifice to a port 297 of the 2-3 timing valve 289, which port 297 is open between the above-indicated small-diameter land and one of the two large-diameter lands of the spool 290. The 2-3 timing valve 289 further has a port 298 which is selectively communicable with the above-indicated port 294 and which is connected through an oil passage 299 to a solenoid relay valve 300. The 2-3 timing valve 289 further has a port which is adjacent to one end of the first plunger 291 and which is connected to the linear solenoid valve SLU, and another port which is adjacent to one end of the second plunger 293 and which is connected through an orifice to the second brake B2.

The above-indicated oil passage 287 is provided to supply the working oil to the second brake B2 and to discharge the oil from this second brake B2. The oil passage 287 is provided with an orifice 301 having a small diameter, and an orifice 302 with a check ball. The oil passage 287 has a branch 303 which is provided with an orifice 304 having a large diameter. The orifice 304 is provided with a check ball which is moved to an open position when the oil is discharged from the second brake B2. The branch 303 is connected to an orifice control valve 305 described below.

The orifice control valve 305 is provided to control the rate of discharge flow of the oil from the second brake B2. This orifice control valve 305 includes a spool 306, and has a port 307 at an intermediate position. The port 307 is opened and closed by the spool 306 and connected to the second brake B2. The orifice control valve 305 further has a port 308 formed at a position below the port 307 as seen in FIG. 13. The above-indicated branch 303 of the oil passage 287 is connected to the port 308. The orifice control valve 305 further has a port 308 formed at a position above the port 307 as seen in FIG. 13. This port 308 is selectively communicable to a drain port and is connected through an oil passage 310 to a port 311 of the B-3 control valve 278. The port 311 is selectively communicable to the output port 283 to which the third brake B3 is connected.

The orifice control valve 305 further has a control port 312 formed adjacent to one end of the spool 306 remote from the spring which acts on the spool 306. This control port 312 is connected through an oil passage 313 to a port 314 of the 3-4 shift valve 272. This port 314 produces an output pressure of the third solenoid-operated valve SL3 when the automatic transmission 218 is placed in any one of the forward-drive positions "3rd", "2nd" and "1st", and produces an output pressure of the fourth solenoid-operated valve SL4 when the automatic transmission 218 is placed in the fourth-speed position "4th" or fifth-speed position "5th". The oil passage 295 has a branch 315 which is connected to the orifice control valve 305. The branch 315 is selectively communicable with the drain port of the orifice control valve 305.

The 2-3 shift valve 271 has a port 316 which produces the hydraulic pressure output (line pressure PL) when the automatic transmission 218 is placed in the first-speed position "1st" or second-speed position "2nd". This port 316 is connected through an oil passage 318 to a port 317 of the 2-3 timing valve 289 which is open to a chamber in which the spring 292 is disposed. The 3-4 shift valve 272 has a port 319 which is communicated with the above-indicated oil passage 287 when the automatic transmission 218 is placed in any one of the positions "3rd", "2nd" and "1st". The port 319 is connected through an oil passage 320 to a solenoid relay valve 300.

Reference numeral 321 in FIG. 13 denotes an accumulator for the second brake B2. The accumulator 321 has a back-pressure chamber to which is applied an accumulator control pressure Pac which is regulated on the basis of an output pressure of a linear solenoid valve SLN (FIG. 11). When the 2-3 shift valve 271 is activated to shift the automatic transmission 218 from the second-speed position "2nd" to the third-speed position "3rd", the hydraulic pressure output (line pressure PL) of the 2-3 shift valve 271 is applied to the second brake B2 through the oil passage 287. With the line pressure PL applied to the second Brake B2, a piston 321p of the accumulator 321 begins to be moved upward. As this piston 321p is moved upward, an engaging pressure PB2 supplied to the brake B2 is increased to a level at which a force based on the pressure PB2 is substantially equal to a sum of a downward biasing force of the spring 321s and a force based on the above-indicated accumulator control pressure Pac which biases the piston 321p downward. Described more precisely, the engaging pressure PB2 gradually rises as the spring 321p is compressed and deformed, and reaches the line pressure PL when the piston 321p reaches its upper stroke end. Namely, the engaging pressure PB2 during the upward movement of the piston 321p is determined by the accumulator control pressure Pac.

As described above, the accumulator control pressure Pac is applied to the accumulator 321 for the second brake 132 which is engaged when the automatic transmission 218 is shifted to the third-speed position "3rd". This accumulator control pressure Pac is also applied to the following accumulators (not shown): accumulator for the clutch C1 which is engaged when the automatic transmission 218 is placed in the first-speed position "1st"; accumulator for the clutch C2 which is engaged when the automatic transmission 218 is placed in the fourth-speed position "4th"; and accumulator for the brake B0 which is engaged when the automatic transmission 218 is placed in the fifth-speed position "5th".

Reference numeral 322 in FIG. 13 denotes a C-0 exhaust valve, and reference numeral 323 denotes an accumulator for the clutch C0. The C-0 exhaust valve 322 is operated to place the clutch C0 in the engaged state for applying an engine brake to the vehicle when the automatic transmission 218 is shifted to the second-speed position "2nd" while the shift lever is placed in the position "2".

In the hydraulic circuit 244 constructed as described above, the hydraulic pressure in the third brake B3 during a releasing action thereof and the hydraulic pressure in the second brake B2 during an engaging action thereof are controlled on the basis of the torque of the input shaft 226 when the automatic transmission 218 is shifted up from the second-speed position "2nd" to the third-speed position "3rd", that is, when the third brake B3 is released while the second brake B2 is engaged. Therefore, the shifting shock is suitably reduced in the present arrangement. Upon other shifting actions of the automatic transmission 218, too, the hydraulic pressures in the clutches C1, C2 and brake B0 during their engaging or releasing actions are controlled by regulation of the accumulator control pressure Pac by controlling the duty cycle of the linear solenoid valve SLN.

The present hybrid drive system 210 includes a hybrid drive controller 250 and an automatic transmission controller 252. Each of these controllers 250, 252 is constituted principally by a microcomputer incorporating a central processing unit (CPU), a random-access memory (RAM), and a read-only memory (ROM). The controllers 250, 252 receive output signals of various detectors or sensors which include: a throttle sensor 261 for detecting the opening angle of a throttle valve, which indicates torque $T_E$ of the engine 212; an accelerator sensor 262 for detecting operation amount $\theta_{AC}$ of the accelerator pedal; an input shaft speed sensor 263 for detecting input shaft speed $N_I$ of the automatic transmission 218; a vehicle speed sensor 264 for detecting the output shaft speed No of the automatic transmission 218, which indicates vehicle running speed V; an engine speed sensor 265 for detecting speed $N_E$ of the engine 212; a motor speed sensor 266 for detecting speed NM of the motor/generator 214; a motor ammeter 266 for detecting an electric current of the motor/generator 214, which indicates torque $T_M$ of the motor 214; a brake switch 268 for detecting an operation of a brake pedal; and a shift position sensor 269 for detecting the currently selected position $L_{SH}$ of the shift lever. The controllers 250 and 252 control the engine 212, electrically controlled torque converter 224 (motor/generator 214 and planetary gear device 216), and automatic transmission 218, on the basis of the input signals and according to control programs stored in the ROM.

The opening angle of the throttle valve, amount of fuel injection and ignition timing of the engine 212 are controlled by the hybrid drive controller 250, so that the output of the engine 212 is controlled depending upon the specific running condition of the vehicle.

Figure 14:
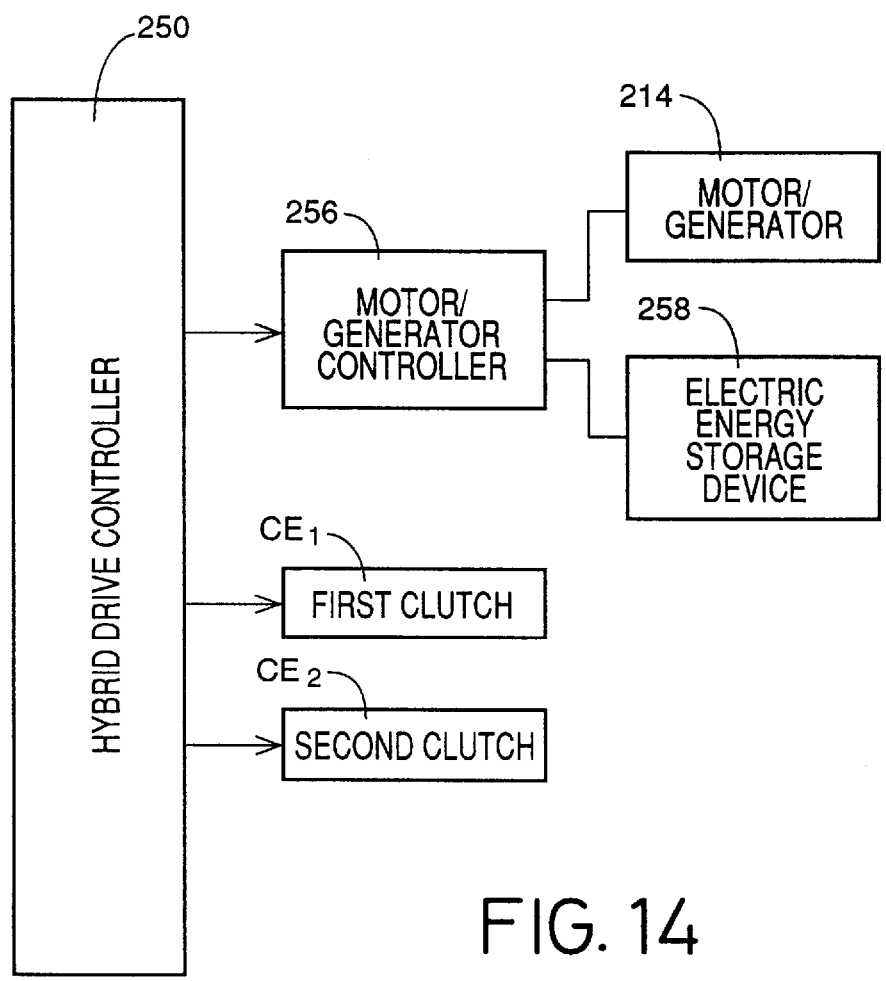
FIG. 14 is a block diagram showing connection between a hybrid drive controller and an electrically controlled torque converter shown in FIG. 11.

The motor/generator 214 is connected to the electric energy storage device 258 through a motor/generator controller (inverter) 256, as indicated in FIG. 14. The hybrid drive controller 250 controls the motor/generator controller 256 to place the motor/generator 214 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 258. In the CHARGING state, the motor/generator 214 is operated as an electric generator or dynamo, by regenerative braking (i.e., electrical braking torque of the motor/generator per se), so as to charge the electric energy storage device 258 with the electric energy. In the NON-LOAD or FREE state, the motor/ generator 214 is placed in a non-load condition permitting free rotation of the rotor shaft 214r.

The first and second clutches CE1, CE2 are controlled by the hybrid drive controller 250 through the solenoid-operated valves and the hydraulic circuit 244. The hydraulic pressure in the first clutch CE1 during an engaging action thereof is regulated by suitable pressure regulating means such as a linear solenoid valve, so that the first clutch CE1 is placed in a SLIP state in which the amount of slip of the first clutch CE1 is held at a predetermined value.

The automatic transmission 218 is controlled by the automatic transmission controller 252 through the above-indicated solenoid-operated valves SL1–SL4 and linear solenoid valves SLU, SLT, SLN of the hydraulic circuit 244, so that the automatic transmission 218 is shifted to the optimum position depending upon the running condition of the vehicle.

In the present hybrid drive system 210, the operation modes 1–9 as indicated in TABLE 4 are available as in the first embodiment, and are selectively established as indicated in the flow chart of FIG. 6. This fourth embodiment further has an operation mode 11 in which the vehicle is started by operations of the engine 212 and the motor/generator 214. The operation mode 11 is established in step SA7 of a vehicle start control sub-routine illustrated in the flow chart of FIG. 15.

stored in the storage device 258 can be used to operate the motor/generator 12 as the drive power source. The lower limit A' is determined depending upon the charging and discharging efficiencies of the storage device 258. The lower limit A may be slightly larger than the lower limit A.

When a negative decision (NO) is obtained in step SA2, it means that the motor/generator 214 cannot be used as the drive power source. In this case, the control flow goes to step SA3 to select the operation mode 5 to start the vehicle by operation of the engine 212. In this operation mode 5, the first clutch CE1 is engaged (turned ON) and the second clutch CE2 is released (turned OFF), while the engine 212 is operated, with the regenerative braking torque of the motor/generator 214 being controlled in the CHARGING state.

It will be understood that a portion of the hybrid drive controller 250 assigned to implement step SA3 constitutes fifth operation mode control means for controlling the hybrid drive system 210 in a fifth operation mode which is the operation mode 5 described above.

If an affirmative decision (YES) is obtained in step SA2, it means that the motor/generator 214 can be used as the drive power source. In this case, the control flow goes to step SA4 to determine whether the currently required output Pd of the hybrid drive system 210 is equal to or larger than a predetermined threshold α. This threshold α is an upper limit of the required output below which the vehicle can be

TABLE 4

| MODE | CLUTCHES | | ENGINE | STORAGE | |
|---|---|---|---|---|---|
| | CE1 | CE2 | 212 | DEVICE 258 | MODE NOMENCLATURE |
| 1 | OFF | ON | OFF | DISCHARGED | MOTOR DRIVE |
| 2 | OFF | ON | ON | NO ENG. CSMD | ENGINE DRIVE |
| 3 | ON | ON | ON | CHARGED | ENGINE DRIVE + CHARGE |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |
| 11 | SLIP | ON | ON | DISCHARGED | VEHICLE START BY ENGINE AND MOTOR |

In TABLE 4, "NO ENG. CSMD" in the column of the storage device 114 means that no electric energy stored in the storage device 114 is consumed.

Figure 15:
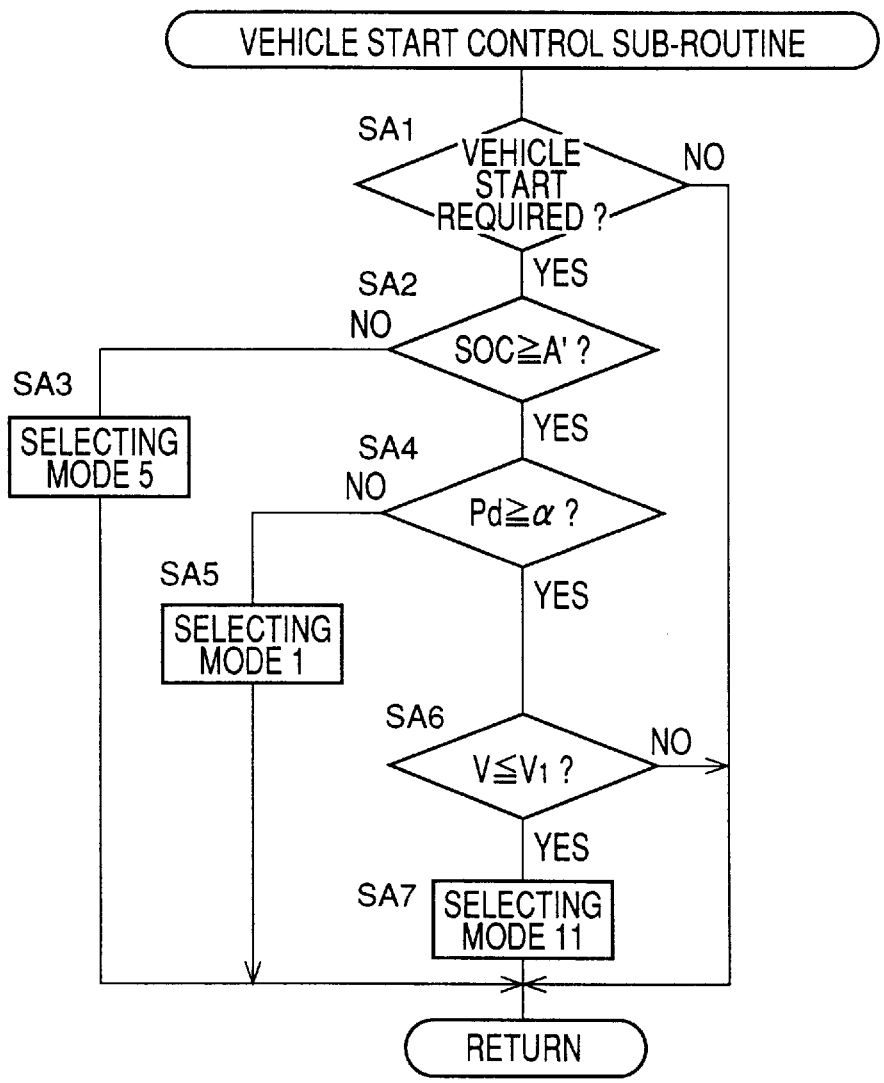
FIG. 15 is a flow chart illustrating an operation of the control system in the embodiment of FIG. 10 upon starting of the vehicle.
Figure 16:
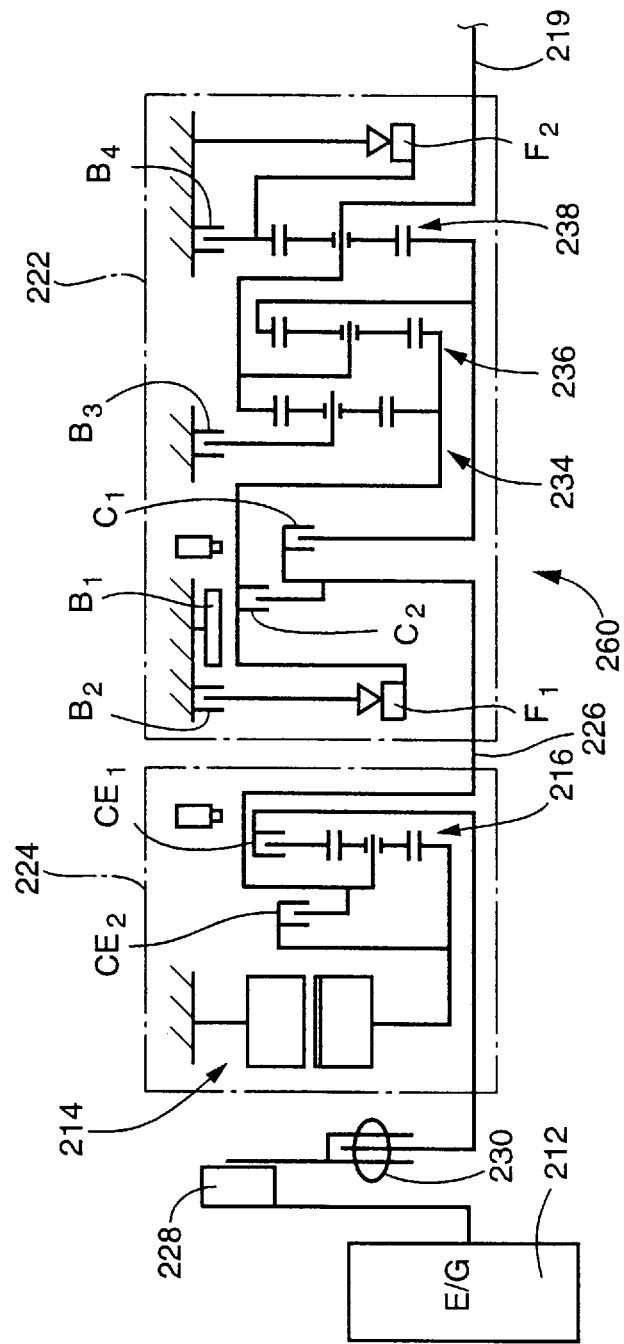
FIG. 16 is a schematic view illustrating a hybrid drive system according to a further embodiment of the invention in which the automatic transmission is different from that of the hybrid drive system of FIG. 10.

The vehicle start control sub-routine of FIG. 15 is initiated with step SA1 to determine whether the vehicle is required to be started. This determination may be effected by determining whether the accelerator pedal is in a depressed state while the vehicle speed V is lower than a predetermined upper limit V2. The determination as to whether the accelerator pedal is in a depressed state may be effected by determining whether the operation amount $\theta_{AC}$ of the accelerator pedal is larger than a predetermined threshold which is close to zero but larger than zero. If an affirmative decision (YES) is obtained in step SA1, the control flow goes to step SA2. If a negative decision (NO) is obtained in SA1, one cycle of execution of the sub-routine of FIG. 15 is terminated. Step SA2 is provided to determine whether the electric energy amount SOC stored in the electric energy storage device 258 is equal to or larger than a predetermined lower limit A'. Like the lower limit A used in the first embodiment, the lower limit A' is a lower limit of the stored electric energy amount SOC above which the electric energy suitably started by only the motor/generator 214. If a negative decision (NO) is obtained in step SA4, it means that the vehicle can be started by only the motor/generator 214. In this case, the control flow goes to step SA5 to select the operation mode 1 in which the vehicle is started by the motor/generator 214.

It will be understood that a portion of the hybrid drive controller 250 assigned to implement step SA5 constitutes first operation mode control means for controlling the hybrid drive system 210 in a first operation mode which is the operation mode 1 described above.

If an affirmative decision (YES) is obtained in step SA4, it means that the drive force produced by the motor/generator 214 is not sufficient to suitably start the vehicle. In this case, the control flow goes to step SA6 to determine whether the vehicle speed V is equal to or lower than a predetermined threshold value V1. If an affirmative decision (YES) is obtained in step SA6, the control flow goes to step SA6 to select the operation mode 11. The threshold valve V1 is a lower limit of the vehicle speed V above which the engine 212 can be operated smoothly with the first clutch CE1 placed in the fully engaged state. The above-indicated upper limit V2 is higher than this threshold value V1. In the operation mode 11, the first clutch CE1 is placed in the SLIP state and the second clutch CE2 is engaged (ON), while the engine 212 and the motor/generator 214 are both operated as the drive power sources to start the vehicle with a relatively large torque, as indicate in TABLE 4. In the SLIP state of the first clutch CE1, the amount of slip or engagement of the first clutch CE1 is held at a predetermined value.

It will be understood that a portion of the hybrid drive controller 250 assigned to implement step SA7 constitutes eleventh operation mode control means for controlling the hybrid drive system 210 in an eleventh operation mode which is the operation mode 11 described above.

In the present hybrid drive system 210, the operation mode 1 is selected in step SA3 when the electric energy amount SOC stored in the electric energy storage device 258 is smaller than the lower limit A' (when the negative decision is obtained in step SA2). In this case, the vehicle is started by the engine 212 with the motor/generator 214 placed in the CHARGING state. The present arrangement is effective to avoid excessive reduction of the stored electric energy amount SOC and consequent deterioration of the charging and discharging efficiencies thereof, and is also effective to prevent a starting failure of the vehicle by the motor/generator 214.

While the automatic transmission 218 provided in the hybrid drive system 210 of FIG. 10 has one reverse-drive position and five forward-drive positions, the automatic transmission 218 may be replaced by an automatic transmission 260 as shown in FIG. 17, which does not have the auxiliary transmission 220 and uses only the primary transmission 222. The automatic transmission 260 has one reverse-drive position and four forward-drive positions.

While the presently preferred embodiments of this invention have been described above by reference to the accompanying drawings, by way of example only, it is to be understood that the invention is not limited to the details of the illustrated embodiments, but may be embodied with various changes, modifications and improvements, which may occur to those skilled in the art.

What is claimed is:

1. A hybrid drive system for a motor vehicle, comprising:
an engine operated by combustion of a fuel;
an electric energy storage device for storing an electric energy;
a motor/generator connected to said electric energy storage device;
a first clutch;
a synthesizing/distributing mechanism consisting of a single planetary gear set including a ring gear as a first rotary element connected to said engine through said first clutch, a sun gear as a second rotary element connected to said motor/generator, a carrier as a third rotary element, and an output member connected to said third rotary element; and
a second clutch for connecting two elements of said first, second and third rotary elements of said single planetary gear set, for rotation of said two elements as a unit.

2. A hybrid drive system according to claim 1, wherein said motor/generator functions as a drive power source for driving said motor vehicle, an electric generator operated by said engine to charge said electric energy storage device, an electric generator operated with a kinetic energy of the motor vehicle to charge said electric energy storage device and apply regenerative brake to the motor vehicle, and an auxiliary drive power source assisting said engine during running of the vehicle with said engine.

3. A hybrid drive system according to claim 1, further comprising first operation mode control means for releasing said first clutch, engaging said second clutch, and operating said motor/generator as a drive power source to drive the motor vehicle.

4. A hybrid drive system according to claim 1, further comprising second operation mode control means for engaging both of said first and second clutches, placing said motor/generator in a non-load state, and operating said engine as a drive power source to drive the motor vehicle.

5. A hybrid drive system according to claim 1, further comprising third operation mode control means for engaging both of said first and second clutches, and operating said engine as a drive power source to drive the motor vehicle while said motor/generator is driven by said engine to charge said electric energy storage device.

6. A hybrid drive system according to claim 1, further comprising fourth operation mode control means for engaging both of said first and second clutches, and operating both of said engine and said motor/generator as drive power sources to drive the motor vehicle.

7. A hybrid drive system according to claim 1, further comprising fifth operation mode control means for engaging said first clutch, releasing said second clutch, and increasing a reaction force of said motor/generator from zero to start the motor vehicle.

8. A hybrid drive system according to claim 7, wherein said fifth operation mode control means increases an output of said engine with an increase in said reaction force of said motor/generator.

9. A hybrid drive system according to claim 7, wherein said synthesizing/distributing mechanism comprises a planetary gear device which includes a ring gear as said first rotary element, a sun gear as said second rotary element, and a carrier as said third rotary element, and wherein a torque capacity of said motor/generator is about $\rho$ times a maximum torque of said engine, where $\rho$ is a ratio of the number of teeth of said sun gear to the number of teeth of said ring gear.

10. A hybrid drive system according to claim 1, further comprising sixth operation mode control means for releasing said first clutch, engaging said second clutch, and causing said motor/generator to be driven by a kinetic energy of the motor vehicle to charge said electric energy storage device while applying regenerative brake to the motor vehicle.

11. A hybrid drive system according to claim 1, further comprising seventh operation mode control means for engaging said first clutch, releasing said second clutch, operating said engine and placing said motor/generator in a non-load state so as to establish electrical neutrality thereof.

12. A hybrid drive system according to claim 1, further comprising eighth operation mode control means for engaging both of said first and second clutches, placing said motor/generator in a non-load state, and turning off said engine, so as to apply engine brake to the motor vehicle.

13. A hybrid drive system according to claim 1, further comprising ninth operation mode control means for engaging said first clutch, and operating said motor/generator to start said engine through said synthesizing/distributing mechanism.

14. A hybrid drive system according to claim 3, wherein said first operation mode control means is operated when a currently required output of the hybrid drive system is not larger than a predetermined threshold, while an amount of electric energy stored in said electric energy storage device is not smaller than a predetermined threshold.

15. A hybrid drive system according to claim 4, wherein said second operation mode control means is operated when a currently required output of the hybrid drive system is within a predetermined range while an amount of electric energy stored in said electric energy storage device is not smaller than a predetermined threshold, or operated when said currently required output is larger than an upper limit of said predetermined range while said amount of electric energy stored in said electric energy storage device is smaller than said predetermined threshold.

16. A hybrid drive system according to claim 5, wherein said third operation mode control means is operated when a currently required output of the hybrid drive system is not larger than a predetermined threshold while an amount of electric energy stored in said electric energy storage device is smaller than a predetermined threshold.

17. A hybrid drive system according to claim 6, wherein said fourth operation mode control means is operated when a currently required output of the hybrid drive system is larger than a predetermined threshold while an amount of electric energy stored in said electric energy storage device is not smaller than a predetermined threshold.

18. A hybrid drive system according to claim 7, wherein said fifth operation mode control means is operated to start the motor vehicle with said engine as a drive power source.

19. A hybrid drive system according to claim 7, wherein said fifth operation mode control means controls a regenerative braking torque of said motor/generator to increase said reaction force, and is operated when an amount of electric energy stored in said electric energy storage device is not larger than a predetermined threshold.

20. A hybrid drive system according to claim 10, wherein said sixth operation mode control means is operated when the motor vehicle is required to be braked while an amount of electric energy stored in said electric energy storage device is smaller than a predetermined threshold.

21. A hybrid drive system according to claim 11, wherein said seventh operation mode control means is operated when the motor vehicle is stopped during running thereof with said engine.

22. A hybrid drive system according to claim 12, wherein said eighth operation mode control means is operated when the motor vehicle is required to be braked while an amount of electric energy stored in said electric energy storage device is not smaller than a predetermined threshold.

23. A hybrid drive system according to claim 1, wherein said synthesizing/distributing mechanism comprises a planetary gear device which includes a ring gear as said first rotary element, a sun gear as said second rotary element, and a carrier as said third rotary element, said hybrid drive system further comprising a brake for inhibiting rotation of said ring gear.

24. A hybrid drive system according to claim 23, further comprising tenth operation mode control means for releasing both of said first and second clutches, engaging said brake, and boosting a torque of said motor/generator by said planetary gear device so that the boosted torque is transmitted to said output member.

25. A hybrid drive system according to 24, wherein said tenth operation mode control means is operated to start the motor vehicle with said motor/generator as a drive power source.

26. A hybrid drive system according to claim 1, wherein said synthesizing/distributing mechanism comprises a planetary gear device which includes a ring gear as said first rotary element, a sun gear as said second rotary element, and a carrier as said third rotary element, said hybrid drive system further comprising a one-way clutch for permitting rotation of said ring gear in the same direction as said engine and inhibiting rotation of said ring gear in a direction opposite to a direction of rotation of said engine.

27. A hybrid drive system according to claim 1, wherein said engine, said synthesizing/distributing mechanism, and said motor/generator are arranged in the order of description, coaxially with a first axis, said hybrid drive system further comprising a differential gear device for distributing power received from said output member to a right wheel and a left wheel of the motor vehicle, said differential gear device including a pair of output shafts which are parallel to said first axis, an input member disposed at substantially the same position as said output member in an axial direction of said first axis, and a differential gear mechanism disposed at substantially the same position as said synthesizing/distributing mechanism in said axial direction.

28. A hybrid drive system according to claim 1, wherein said second clutch connects said sun gear and said carrier.

29. A hybrid drive system for a motor vehicle, comprising:

an engine operated by combustion of a fuel;

an electric energy storage device for storing an electric energy;

a motor/generator connected to said electric energy storage device;

a first clutch;

a synthesizing/distributing mechanism including a first rotary element connected to said engine through said first clutch, a second rotary element connected to said motor/generator, a third rotary element, and an output member connected to said third rotary element; and a second clutch for connecting two elements of said first, second and third rotary elements of said synthesizing/distributing mechanism, for rotation of said two elements as a unit, and wherein said synthesizing/distributing mechanism comprises a planetary gear device which includes a ring gear as said first rotary element, a sun gear as said second rotary element, and a carrier as said third rotary element, said motor/generator having a torque capacity which is about $\rho$ times a maximum torque of said engine, where $\rho$ is a ratio of the number of teeth of said sun gear to the number of teeth of said ring gear.

30. A hybrid drive system for a motor vehicle, comprising:

an engine operated by combustion of a fuel;

an electric energy storage device for storing an electric energy;

a motor/generator connected to said electric energy storage device;

a first clutch;

a synthesizing/distributing mechanism including a first rotary element connected to said engine through said first clutch, a second rotary element connected to said motor/generator, a third rotary element, and an output member connected to said third rotary element, said synthesizing/distributing mechanism comprising a planetary gear device which includes a ring gear as said first rotary element, a sun gear as said second rotary element, and a carrier as said third rotary element;

a second clutch for connecting two elements of said first, second and third rotary elements of said synthesizing/ distributing mechanism, for rotation of said two elements as a unit; and a brake for inhibiting rotation of said ring gear.

31. A hybrid drive system for a motor vehicle, comprising:

an engine operated by combustion of a fuel;

an electric energy storage device for storing an electric energy;

a motor/generator connected to said electric energy storage device;

a first clutch;

a synthesizing/distributing mechanism including a first rotary element connected to said engine through said first clutch, a second rotary element connected to said motor/generator, a third rotary element, and an output member connected to said third rotary element, said synthesizing/distributing mechanism comprising a planetary gear device which includes a ring gear as said first rotary element, a sun gear as said second rotary element, and a carrier as said third rotary element;

a second clutch for connecting two elements of said first, second and third rotary elements of said synthesizing/distributing mechanism, for rotation of said two elements as a unit; and a one-way clutch for permitting rotation of said ring gear in the same direction as said engine and inhibiting rotation of said ring gear in a direction opposite to a direction of rotation of said engine.

32. A hybrid drive system for a motor vehicle, comprising:

an engine operated by combustion of a fuel;

an electric energy storage device for storing an electric energy;

a motor/generator connected to said electric energy storage device;

a first clutch;

a synthesizing/distributing mechanism including a first rotary element connected to said engine through said first clutch, a second rotary element connected to said motor/generator, a third rotary element, and an output member connected to said third rotary element; and a second clutch for connecting two elements of said first, second and third rotary elements of said synthesizing/distributing mechanism, for rotation of said two elements as a unit, and wherein said engine, said synthesizing/distributing mechanism, and said motor/generator are arranged in the order of description, coaxially with a first axis, said hybrid drive system further comprising a differential gear device for distributing power received from said output member to a right wheel and a left wheel of the motor vehicle, said differential gear device including a pair of output shafts which are parallel to said first axis, an input member disposed at substantially the same position as said output member in an axial direction of said first axis, and a differential gear mechanism disposed at substantially the same position as said synthesizing/distributing mechanism in said axial direction.

* * * * *